(12) United States Patent
Bidkar et al.

(10) Patent No.: US 9,115,810 B2
(45) Date of Patent: Aug. 25, 2015

(54) PRESSURE ACTUATED FILM RIDING SEALS FOR TURBO MACHINERY

(71) Applicant: General Electric Company, Schenectady, NY (US)

(72) Inventors: Rahul Anil Bidkar, Niskayuna, NY (US); Azam Mihir Thatte, Arlington, MA (US); Nathan Evan McCurdy Gibson, West Chester, OH (US); Andrew Paul Giametta, Greenville, SC (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/045,083

(22) Filed: Oct. 3, 2013

(65) Prior Publication Data

US 2014/0117624 A1    May 1, 2014

Related U.S. Application Data

(63) Continuation-in-part of application No. 13/665,431, filed on Oct. 31, 2012.

(51) Int. Cl.
   *F16J 15/447* (2006.01)
   *F16J 15/44* (2006.01)

(52) U.S. Cl.
   CPC .............. *F16J 15/447* (2013.01); *F16J 15/442* (2013.01); *Y10T 29/49826* (2015.01)

(58) Field of Classification Search
   USPC ......... 277/411, 412, 413, 416, 500, 543, 545, 277/546, 578; 415/115
   See application file for complete search history.

(56) References Cited

U.S. PATENT DOCUMENTS

| 2,181,203 A | * | 11/1939 | Reynolds ....................... 277/504 |
| 3,559,725 A | | 2/1971 | Pulick et al. |
| 5,100,158 A | | 3/1992 | Gardner |
| 5,370,402 A | | 12/1994 | Gardner et al. |

(Continued)

FOREIGN PATENT DOCUMENTS

| EP | 0629799 A1 | 12/1994 |
| KR | 1020120021681 A | 3/2012 |

OTHER PUBLICATIONS

Shellef et al., "A Bi-Directional Gas Face Seal", Tribology Transactions, vol. 35, Issue 1, pp. 53-58 1992.

(Continued)

*Primary Examiner* — Kristina Fulton
*Assistant Examiner* — Eugene G Byrd
(74) *Attorney, Agent, or Firm* — John P. Darling

(57) ABSTRACT

A seal assembly for a rotary machine is provided. The seal assembly includes multiple sealing device segments disposed circumferentially intermediate to a stationary housing and a rotor. Each of the sealing device segments includes a stator interface element, a shoe plate having an extended portion having one or more labyrinth teeth facing the rotor and a load bearing portion, wherein the shoe plate is configured to generate an aerodynamic force between the shoe plate and the rotor. The sealing device segment further includes a secondary seal configured to be in contact with the stator interface element at a radially outer end and configured to be in contact with an elevated nose section of the extended portion of the shoe plate on a radially inner end; and multiple flexible elements attached to the shoe plate and to the stator interface element.

11 Claims, 21 Drawing Sheets

(56) References Cited

U.S. PATENT DOCUMENTS

| | | | |
|---|---|---|---|
| 5,427,455 A | 6/1995 | Bosley | |
| 5,632,493 A * | 5/1997 | Gardner | 277/411 |
| 5,797,723 A * | 8/1998 | Frost et al. | 415/174.2 |
| 5,902,049 A * | 5/1999 | Heshmat | 384/106 |
| 5,954,477 A | 9/1999 | Balsdon | |
| 6,145,843 A * | 11/2000 | Hwang | 277/400 |
| 6,390,476 B1 | 5/2002 | Tong et al. | 277/355 |
| 6,505,837 B1 * | 1/2003 | Heshmat | 277/411 |
| 6,655,696 B1 * | 12/2003 | Fang et al. | 277/409 |
| 6,811,154 B2 | 11/2004 | Proctor et al. | |
| 6,840,519 B2 * | 1/2005 | Dinc et al. | 277/413 |
| 7,044,470 B2 | 5/2006 | Zheng | |
| 7,226,053 B2 * | 6/2007 | Nakano et al. | 277/355 |
| 7,261,300 B2 * | 8/2007 | Agrawal et al. | 277/399 |
| 7,614,792 B2 * | 11/2009 | Wade et al. | 384/104 |
| 7,726,660 B2 | 6/2010 | Datta | |
| 8,074,997 B2 | 12/2011 | Garrison et al. | |
| 8,113,771 B2 * | 2/2012 | Turnquist et al. | 415/173.3 |
| 8,172,232 B2 | 5/2012 | Justak | |
| 2002/0192074 A1 * | 12/2002 | Turnquist et al. | 415/173.3 |
| 2003/0071422 A1 | 4/2003 | Holder | |
| 2003/0102630 A1 * | 6/2003 | Dinc et al. | 277/355 |
| 2004/0046327 A1 * | 3/2004 | Menendez et al. | 277/412 |
| 2004/0119238 A1 * | 6/2004 | Skumawitz et al. | 277/412 |
| 2004/0207158 A1 * | 10/2004 | Agrawal et al. | 277/364 |
| 2007/0132193 A1 | 6/2007 | Wolfe et al. | |
| 2008/0003099 A1 | 1/2008 | Giesler et al. | |
| 2008/0265513 A1 * | 10/2008 | Justak | 277/301 |
| 2008/0309019 A1 * | 12/2008 | Wolfe et al. | 277/420 |
| 2009/0066033 A1 * | 3/2009 | Lusted et al. | 277/411 |
| 2009/0160135 A1 | 6/2009 | Turini et al. | |
| 2010/0143101 A1 | 6/2010 | Fang et al. | |
| 2011/0304101 A1 | 12/2011 | Grondahl et al. | |
| 2012/0223483 A1 * | 9/2012 | Bidkar et al. | 277/301 |
| 2013/0058765 A1 * | 3/2013 | Zheng et al. | 415/173.1 |
| 2014/0008871 A1 * | 1/2014 | Bidkar et al. | 277/303 |
| 2014/0062024 A1 * | 3/2014 | Bidkar et al. | 277/303 |

OTHER PUBLICATIONS

Ya et al., "Numerical Simulation and Characteristics Analysis of the Turbine Shaft End Spiral Groove Mechanical Seal", 2012 Third International Conference on Digital Manufacturing and Automation (ICDMA), pp. 558-561.

Zhang et al., "Influence of Rotor Axial Shifting and Clearance on Leakage in Stepped Seal in Steam Turbines", 2010 Asia-Pacific Power and Energy Engineering Conference (APPEEC), 2010, pp. 1-4.

Meng et al., "Influence of Tooth Position and Clearances on Leakage in Labyrinth Seal in Turbine", 2011 Asia-Pacific Power and Energy Engineering Conference (APPEEC), 2011, pp. 1-6.

"Development of Pressure Actuated Leaf Seals for Improved Turbine Shaft Sealing(ST9887-1)", Downloaded from Internet :< "http://www.nyserda.ny.gov/BusinessAreas/Energy-Innovation-and-Business-Development/Research-and-Development/Research-Project/Research-Projects/Research-Project-Search-Results/Project-Information.aspx?p=5032&R=1&PDF=true">: on Aug. 1, 2013, NYSERDA, Product Catalogue, 2 Pages.

* cited by examiner

PRESSURE ACTUATED FILM RIDING SEALS FOR TURBO MACHINERY

CROSS REFERENCE TO RELATED APPLICATIONS

This application is a Continuation in Part application to U.S. patent application Ser. No. 13/665,431, entitled "FILM RIDING AERODYNAMIC SEALS FOR ROTARY MACHINES," filed Oct. 31, 2012, which is herein incorporated by reference in its entirety.

STATEMENT REGARDING FEDERALLY SPONSORED RESEARCH & DEVELOPMENT

This invention was made with partial Government support under contract number DE-FC26-05NT42643 awarded by U.S. Department of Energy. The Government has certain rights in the invention.

BACKGROUND

The present application relates generally to seal assemblies for turbo-machinery and more particularly relates to film riding seal assemblies for sealing rotor-stator gaps and the like.

Various types of turbo-machinery, such as gas turbine engines, aircraft engines and steam turbines are known and widely used for power generation, propulsion, and the like. The efficiency of the turbo-machinery depends in part upon the clearances between the internal components and the leakage of primary and secondary fluids through these clearances. For example, large clearances may be intentionally allowed at certain rotor-stator interfaces to accommodate large, thermally or mechanically-induced, relative motions. Leakage of fluid through these gaps from regions of high pressure to regions of low pressure may result in poor efficiency for the turbo-machinery. Such leakage may impact efficiency in that the leaked fluids fail to perform useful work.

Different types of sealing systems are used to minimize the leakage of fluid flowing through turbo-machinery. The sealing systems, however, often are subject to relatively high temperatures, thermal gradients, and thermal and mechanical expansion and contraction during various operational stages that may increase or decrease the clearance therethrough. For example, traditional labyrinth seals that are assembled to run very tight clearance during start-up transient phase might run with large clearances during steady state operations, thereby leading to poor performance at steady state operation.

There is therefore a desire for improved compliant sealing assemblies for use with turbo-machinery for sealing rotor-stator gaps. Preferably such compliant sealing assemblies may provide tighter sealing during steady state operations while avoiding rubbing, wear caused by contact and damage during transient operations. Such sealing assemblies should improve overall system efficiency while being inexpensive to fabricate and providing an increased life for the associated parts.

BRIEF DESCRIPTION

In accordance with an embodiment of the invention, a seal assembly for a rotary machine is provided. The seal assembly includes multiple sealing device segments disposed circumferentially intermediate to a stationary housing and a rotor. Each of the sealing device segments includes a stator interface element. The sealing device segment also includes a shoe plate having an extended portion having one or more labyrinth teeth facing the rotor and a load bearing portion, wherein the shoe plate is configured to allow a high pressure fluid to an upstream portion of forwardmost labyrinth tooth and a low pressure fluid to a downstream portion of the aftmost labyrinth tooth and further configured to generate an aerodynamic force between the shoe plate and the rotor. The sealing device segment further includes a secondary seal configured to be in contact with the stator interface element at a radially outer end and configured to be in contact with an elevated nose section of the extended portion of the shoe plate on a radially inner end; and multiple flexible elements attached to the shoe plate and to the stator interface element.

In accordance with an embodiment of the invention, a seal assembly for a rotary machine is provided. The seal assembly includes multiple sealing device segments disposed circumferentially intermediate to a stationary housing and a rotor. Each of the sealing device segments includes a stator interface element. The sealing device segment also includes a shoe plate comprising one or more labyrinth teeth facing the rotor and a load bearing surface region, wherein the shoe plate is configured to allow a high pressure fluid to an upstream portion of forwardmost labyrinth tooth and a low pressure fluid to a downstream portion of the aftmost labyrinth tooth and further configured to generate an aerodynamic force between the shoe plate and the rotor. The sealing device segment further includes a secondary seal configured to be in contact with the stator interface element at a radially outer end and configured to be in contact with an elevated nose of the shoe plate on a radially inner end; and multiple flexible elements attached to the shoe plate and to the stator interface element. The seal assembly further includes the rotor having a stepped section towards a high pressure side of the rotary machine for reducing an axial momentum of flow of fluid across the one or more labyrinth teeth of the shoe plate.

In accordance with an embodiment of the invention, a method of manufacturing a sealing device segment is provided. The method includes disposing a shoe plate comprising an extended portion having one or more labyrinth teeth facing the rotor and a load bearing surface region intermediate to a stationary housing and a rotor in a rotary machine, wherein the shoe plate is configured to allow a high pressure fluid to an upstream portion of the forwardmost labyrinth tooth and a low pressure fluid to a downstream portion of the aftmost labyrinth tooth and further configured to generate an aerodynamic force between the shoe plate and the rotor. The method also includes arranging a secondary seal to be in contact with a stator interface element at a radially outer end and in contact with an elevated nose section of the extended portion of the shoe plate on a radially inner end. Further, the method includes attaching a plurality of flexible elements to the shoe plate and to the stator interface element.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
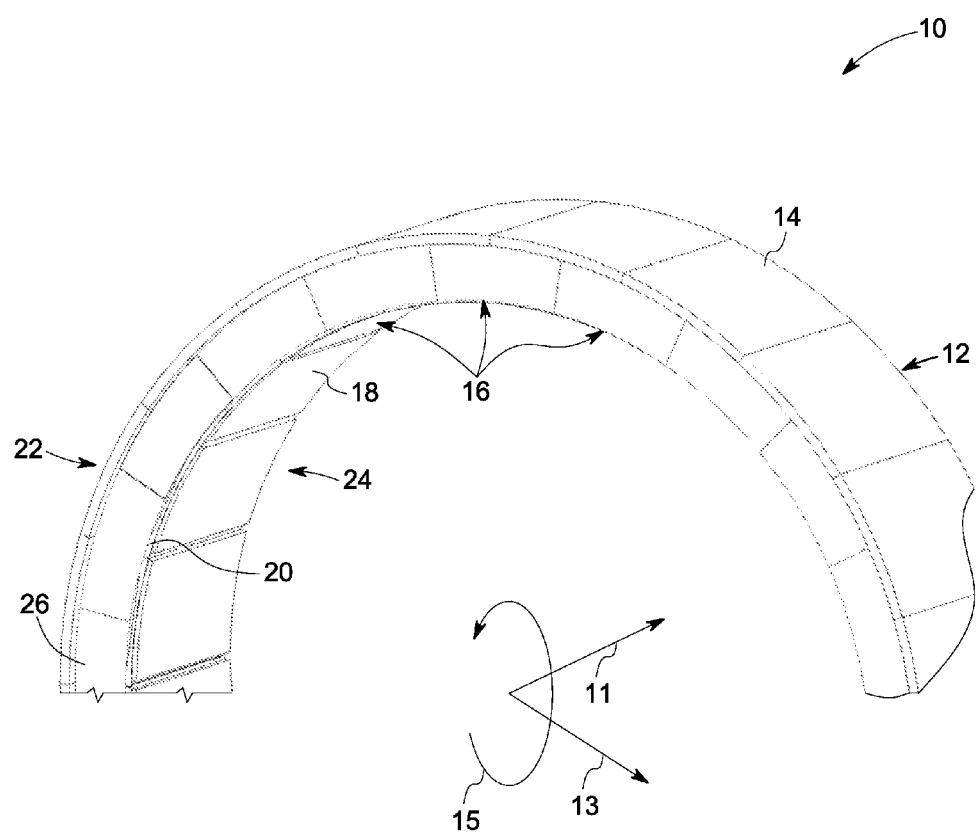
FIG. 1 is a perspective view of a film riding seal assembly of a rotary machine in accordance with an embodiment of the present invention.

FIG. 1 is a perspective view of a film riding seal assembly 10 (only a few segments are shown instead of the entire 360 degree assembly) for a rotary machine in accordance with an embodiment of the present invention. The film riding seal assembly 10 is shown to have an orientation in axial, radial and circumferential direction as given by 11, 13 and 15 respectively. The seal assembly 10 is circumferentially arranged around a rotor shaft (not shown) that is axially located in the rotary machine such that the seal assembly 10 is intermediate to a stationary housing 12 and the rotor shaft (not shown). The stationary housing 12 includes multiple stator interface elements 14 that form the radially outwards region of the seal assembly 10. The seal assembly 10 includes multiple sealing device segments 16 located adjacent to each other to form the seal assembly 10. Each of the sealing device segment 16 includes a shoe plate 18 located proximate to the rotor shaft (not shown). During operation of the rotary machine, the shoe plate 18 rides on a fluid film above the rotor shaft (not shown). The seal assembly 10 also includes one or more labyrinth teeth 20 located on the shoe plate 18 at a side facing the rotor shaft surface. In one embodiment as shown, the one or more labyrinth teeth 20 are located towards forward-most region of the shoe plate 18. In another embodiment, the one or more labyrinth teeth 20 are located towards an aftmost region of the shoe plate 18. The one or more labyrinth teeth 20 substantially separate a high pressure region 22 from a low pressure region 24 on either sides of the seal assembly 10 of the rotary machine. The seal assembly 10 also includes multiple secondary seals 26 configured to be in contact with the stator interface elements 14 at a radially outer end and configured to be in contact with the shoe plate 18 on a radially inner end. In one embodiment, the secondary seal 26 includes an outer layer section 28 (shown in FIG. 2) and an inner layer section 30 (shown in FIG. 2) such that each of the outer layer section 28 of the secondary seal 26 overlaps the sealing device segment gaps formed between inner layer sections 30 of adjacent secondary seal segments 16.

Figure 2:
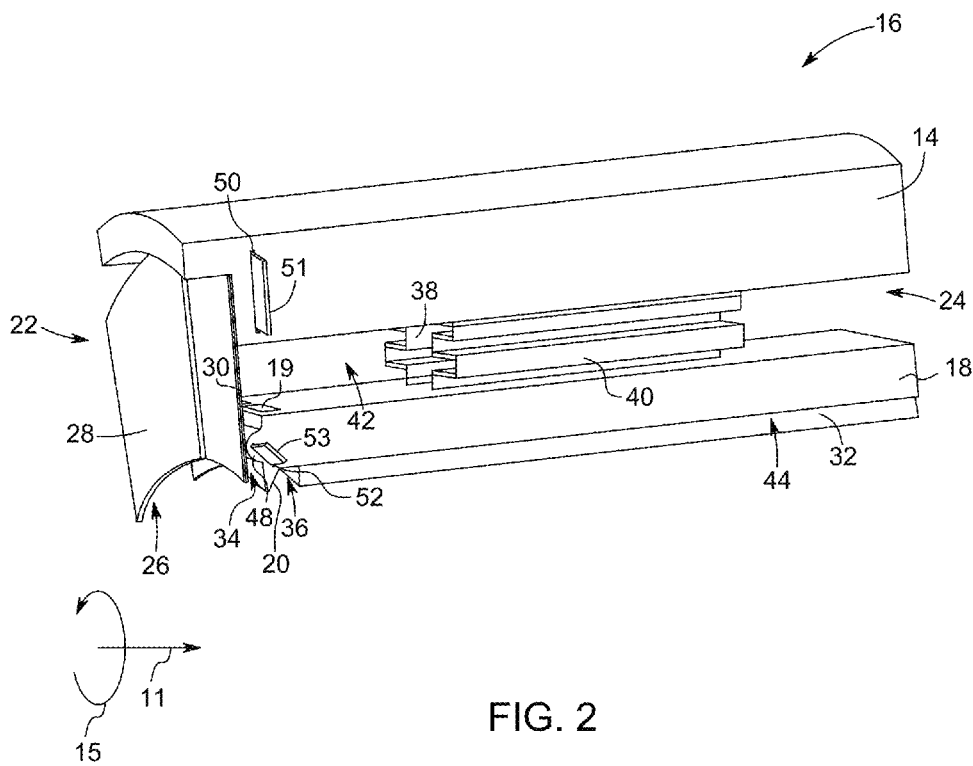
FIG. 2 is a perspective view of a sealing device segment in accordance with an embodiment of the present invention.

FIG. 2 is a perspective view of the sealing device segment 16 in accordance with an embodiment of the present invention. As shown, the sealing device segment 16 includes stator interface element 14 and the shoe plate 18. In the embodiment as shown, the shoe plate 18 includes the one or more labyrinth teeth 20 facing the rotor and a load-bearing surface region 32. The shoe plate 18 is configured to allow a high pressure fluid to an upstream portion 34 of forwardmost labyrinth tooth 20 and a low pressure fluid to a downstream portion 36 of the aftmost labyrinth tooth 20 and further configured to generate an aerodynamic force between the shoe plate 18 and the rotor. The sealing device segment 16 also includes multiple flexible elements attached to the shoe plate 18 and the stator interface element 14. As shown in this embodiment, the multiple flexible elements include multiple bellow springs 38, 40 attached to the shoe plate 18 and the stator interface element 14. In one embodiment, the sealing device segment 16 includes multiple flexures attached to the shoe plate 18 and the stator interface element 14 instead of the multiple bellow springs.

Non-limiting examples of the flexible elements may include bellow springs, flexures or other spring-like elements including flexible beams, leaf springs or coil springs. It is to be noted that in FIG. 2, the flexible element is shown as bellow springs but such depiction should not be restrictive to the invention in this application. The purpose of the flexible element is to support the shoe plate 18 with radial, tangential and axial stiffness properties and guide the motion of the shoe plate 18 relative to the stator interface element 14.

As shown in FIG. 2, the shoe plate 18 includes one or more ports 19 located axially downstream of the one or more labyrinth teeth 20 for allowing flow of low pressure fluid from the downstream portion 36 of aftmost labyrinth tooth 20 to the rear cavity 42. In one embodiment, the one or more ports 19 are angled for allowing flow of the low pressure fluid in a radial direction from behind the labyrinth teeth 20 into a rear cavity 42 formed by the plurality of bellow springs 38, 40 or flexures, the stator interface element 14 and the shoe plate 18. In another embodiment, the one or more ports 19 are angled for allowing flow of the low pressure fluid in a circumferential direction causing the fluid to swirl as the fluid transfers from behind the labyrinth teeth to radially above the shoe plate 18. The swirl causes the fluid to gain tangential velocity in a direction of rotation of the rotor or opposite to the direction of rotation of the rotor. The shoe plate 18 also includes feeding grooves 44 oriented axially on both sides of the load-bearing surface region 32 of the shoe plate 18. The one or more ports 19 on the shoe plate 18 located axially downstream of the labyrinth teeth 20 along with the feeding grooves 44 ensure that low pressure fluid is present downstream of the labyrinth teeth 20.

Further as shown, the sealing device segment 16 also includes the secondary seal 26 with the outer layer section 28 and an inner layer section 30. In one embodiment, the inner layer section 30 is attached via welding or brazing with the stator interface element 14 at a radially outer end. The outer layer section 28 of the secondary seal 26 includes an overhanging portion that overlaps the segment gaps between the inner layer sections 30 of neighboring sealing device segments 16. The details of the outer layer section 28 of the secondary seal 26 are illustrated further in FIG. 4, which shows adjacent sealing device segments 16 of the film riding seal assembly 10.

Figure 3:
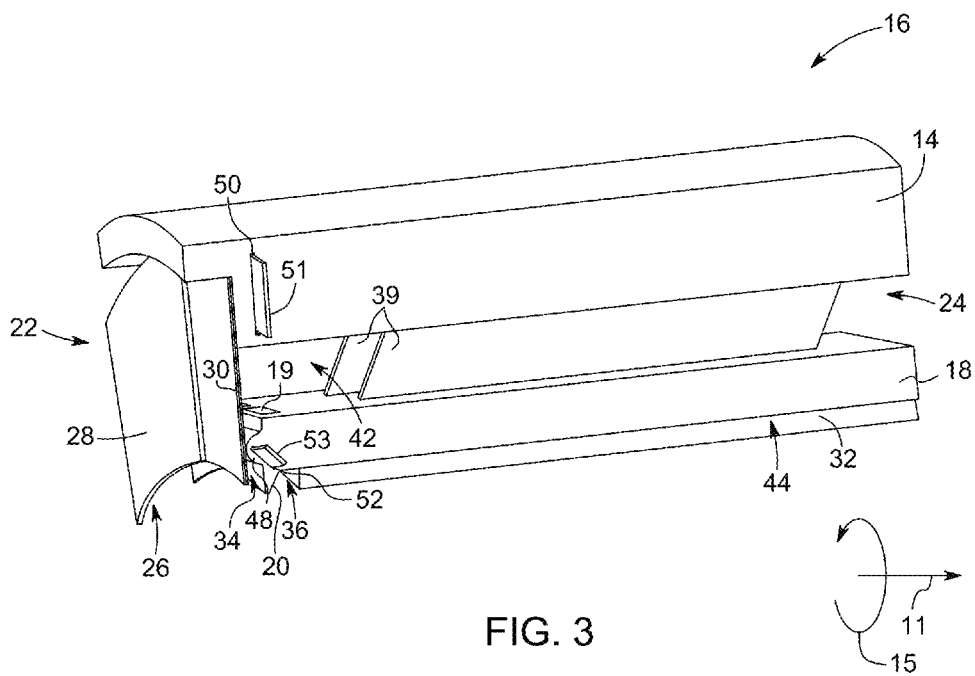
FIG. 3 is a perspective view of a sealing device segment in accordance with an embodiment of the present invention.

FIG. 3 is a perspective view of the sealing device segment 16 in accordance with an embodiment of the present invention. In this embodiment, the sealing device segment 16 includes flexible elements that are flexible beams 39 for supporting the shoe plate 18 with radial, tangential and axial stiffness properties and guide the motion of the shoe plate 18 relative to the stator interface element 14.

Figure 4:
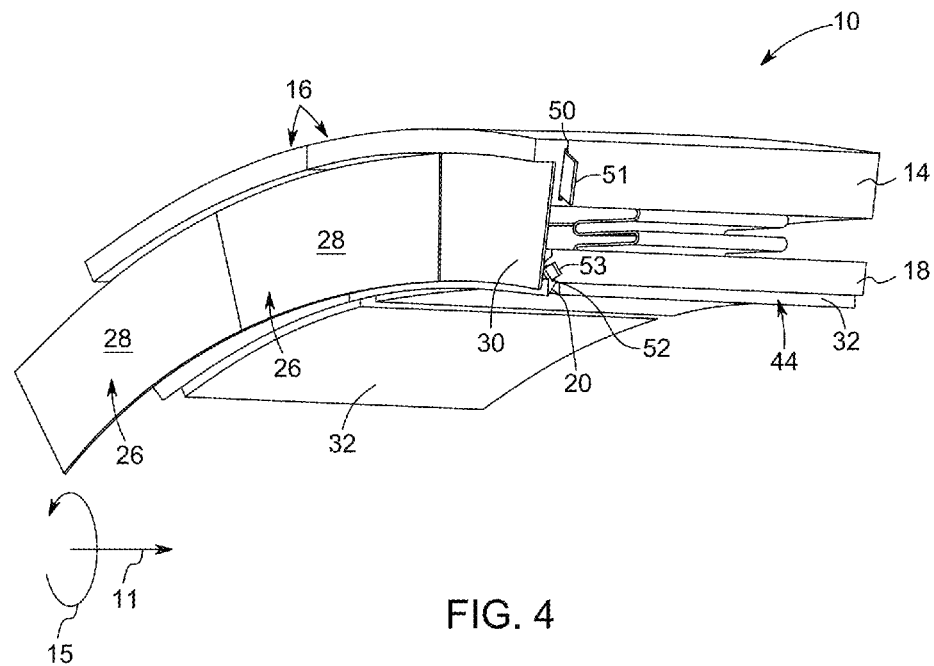
FIG. 4 is a perspective view of adjacent sealing device segments of a film riding seal assembly of a rotary machine in accordance with an embodiment of the present invention.

As shown in FIG. 4, a portion of the outer layer section 28 of the secondary seal 26 is attached with the stator interface element or the inner layer section 30 via welding or brazing at the radially outer end. The remaining overhanging portion of the outer layer section 28 overlaps the segment gaps between the inner layer sections 30 of neighboring sealing device segments 16. The overhanging portion of the outer layer 28 extends beyond the single sealing device segment 16 and is ship lapped with the inner layer section 30 of adjacent sealing device segment 16. Further, the outer layer 28 is free to slide over the inner layer sections 30 of neighboring sealing device segments 16. As shown in FIG. 4, only the inner layer section 30 of the secondary seal 26 is configured to be in a line contact with an elevated nose 48 of the shoe plate 18 on the radially inner side.

Furthermore in the embodiments shown in FIG. 2, FIG. 3 and FIG. 4, the stator interface element 14 includes one or more grooves or slots 50 at sides for allowing disposal of spline seal shims 51 for reducing segment-gap leakage between stator interface elements 14 of neighboring sealing device segments 16. Similarly, the shoe plate might include grooves or slots 52 for allowing disposal of spline seal shims 53 for reducing segment-gap leakages between shoe plates 18 of neighboring sealing device segments 16.

Figure 5:
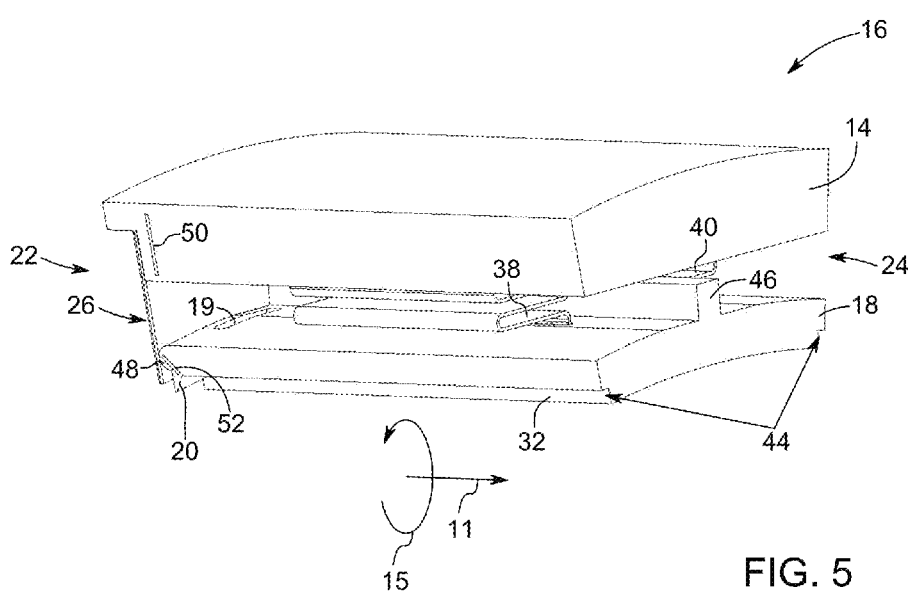
FIG. 5 is a perspective view of a sealing device segment in accordance with another embodiment of the present invention.

FIG. 5 shows another perspective view of the sealing device segment 16 in accordance with an embodiment of the present invention. In one embodiment as shown, the shoe plate 18 also includes one or more axial rib sections 46. The one or more axial rib sections 46 are used to increase the flexural stiffness of the shoe plate 18 against aerodynamic and aerostatic loads during operation of the rotary machine.

Figure 6:
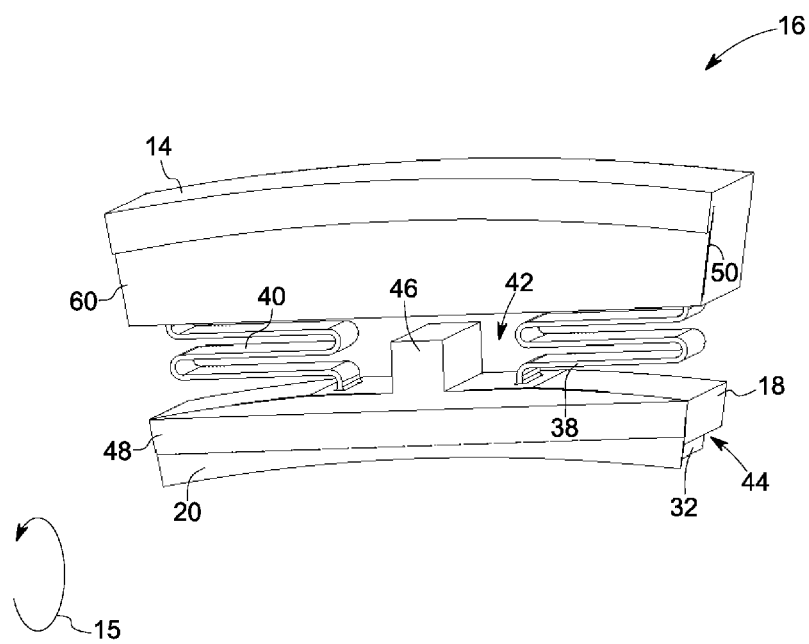
FIG. 6 is a front perspective view of a portion of a sealing device segment in accordance with an embodiment of the present invention.

FIG. 6 is a front perspective view of a portion of a sealing device segment in accordance with an embodiment of the present invention. It is to be noted that the secondary seal 26 has not been shown for the purpose of illustrating a flat region 60 of the stator interface element where the radially outer end of the inner layer section 30 (shown in FIG. 2, FIG. 3 and FIG. 4) of the secondary seal 26 (shown in FIG. 2, FIG. 3, FIG. 4 and FIG. 5) is attached via brazing or welding.

Figure 7:
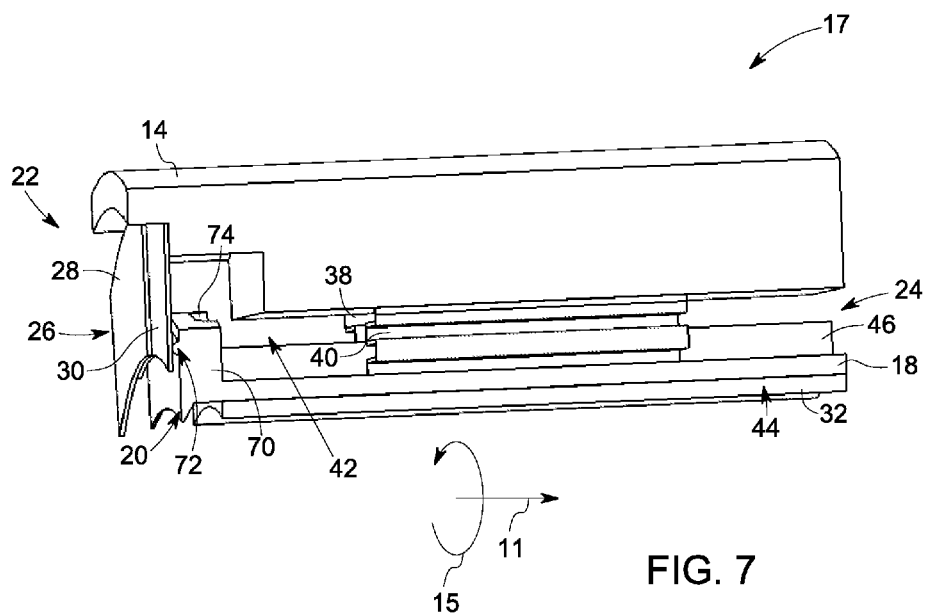
FIG. 7 is a perspective view of a sealing device segment in accordance with another embodiment of the present invention.

FIG. 7 is a perspective view of a sealing device segment 17 in accordance with another embodiment of the present invention. As shown, the shoe plate 18 includes a L-shaped structure 70 with an elevated nose section 72 for contact with the inner layer section 30 of the secondary seal 26. The L-shaped structure includes one or more labyrinth teeth 20 located towards a front end of the shoe plate 18 for separating the high pressure side 22 from the low pressure side 24. In this embodiment, the L-shaped structure includes one or more ports 74 for allowing flow of low pressure fluid from the downstream portion of aftmost labyrinth tooth 20 to the rear cavity 42.

Figure 8:
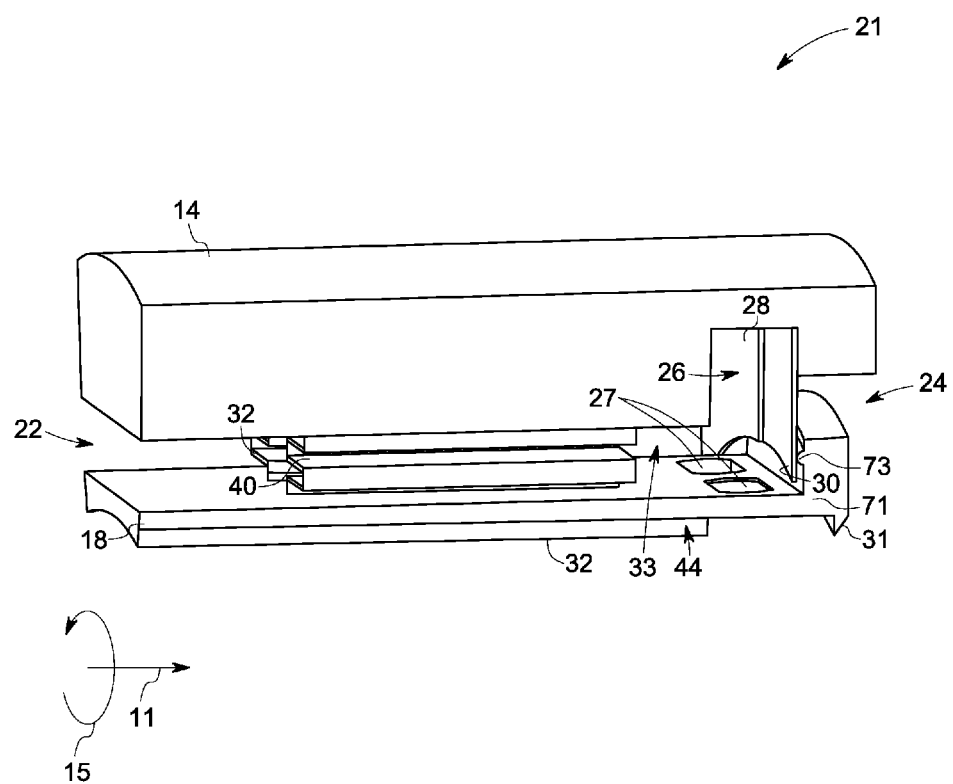
FIG. 8 is a perspective view of a sealing device segment in accordance with yet another embodiment of the present invention.

FIG. 8 is a perspective view of a sealing device segment 21 in accordance with yet another embodiment of the present invention. In this embodiment, the shoe plate 18 includes a L-shaped structure 71 with an elevated nose section 73 for contact with the inner layer section 30 of the secondary seal 26. The L-shaped structure includes one or more labyrinth teeth 31 located towards a backward end of the shoe plate 18 for separating a high pressure side from a low pressure side and one or more ports 27 for allowing flow of high pressure fluid from a front cavity 33 formed by the plurality of bellow springs 38, 40 or flexures, the stator interface element 14 and the shoe plate 18 to an upstream portion of frontmost labyrinth tooth 31. In one embodiment, the one or more ports 27 are angled for allowing flow of the high pressure fluid in a radial direction from the front cavity 33 to the upstream portion of the forwardmost labyrinth tooth 31. In another embodiment, the one or more ports 27 are angled for allowing flow of the high pressure fluid in a circumferential direction causing the fluid to swirl as the fluid transfers from the front cavity 33 to the upstream portion of the forwardmost labyrinth tooth 31.

Figure 9:
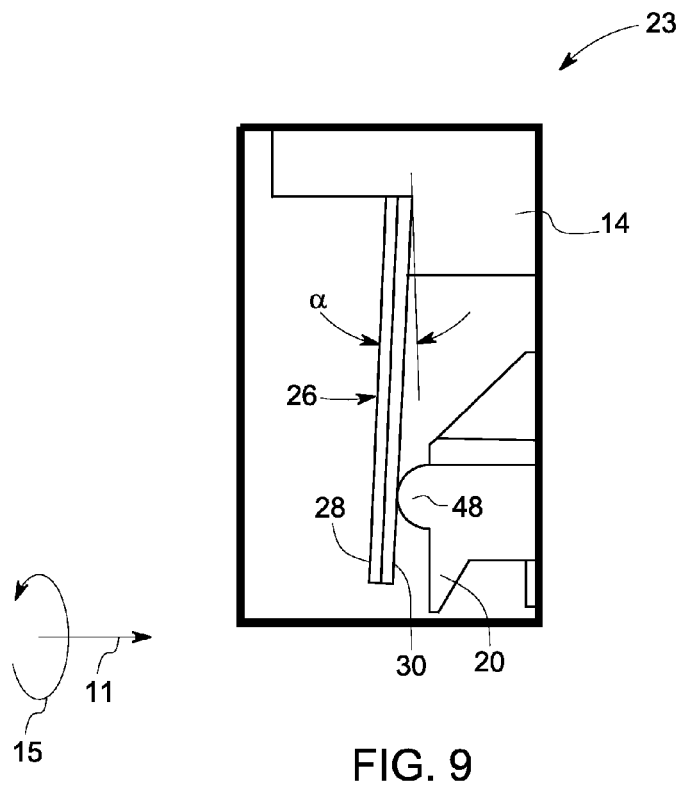
FIG. 9 is a portion of a sealing device segment in accordance with one embodiment of the present invention.

FIG. 9 shows a portion of a sealing device segment 23 in accordance with one embodiment of the present invention. The secondary seal 26 with the outer layer section 28 and the inner layer section 30 is attached to the stator interface element 14 such that the secondary seal 26 is tilted with respect to a direction perpendicular to an axial direction of the rotary machine to include an optimum angle 'α'. This optimum angle 'α' is included for attaining an almost constant magnitude of contact force for compensating the reduced contact force caused in the event of reduction in effective length of the pressure-loaded portion of the secondary seal 26.

Figure 10:
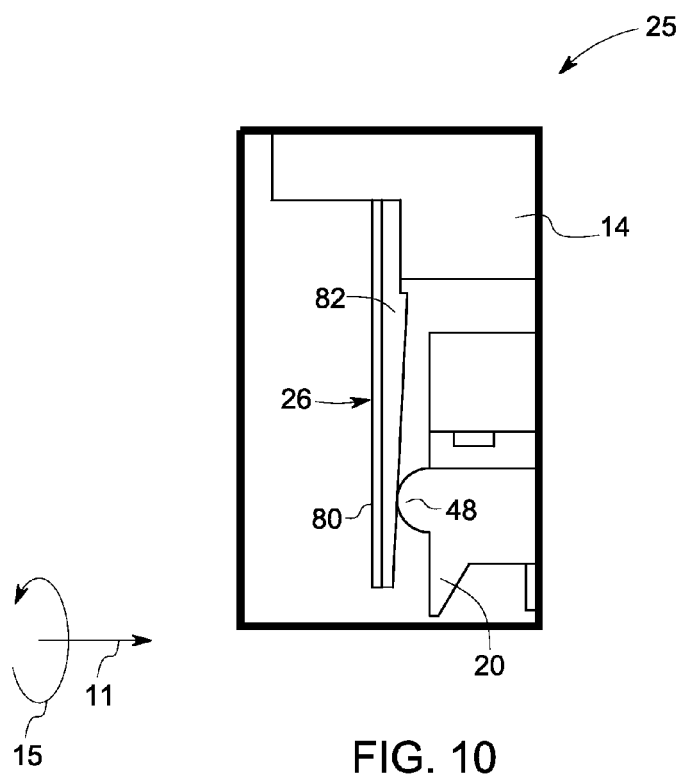
FIG. 10 is a portion of a sealing device segment in accordance with another embodiment of the present invention.

FIG. 10 shows a portion of a sealing device segment 25 in accordance with one embodiment of the present invention. As shown, in this embodiment, the secondary seal 26 includes an outer layer section 80 and an inner layer section 82 with a slanted profile for maintaining an almost constant force between the secondary seal 26 and the elevated nose 48 of the shoe plate 18 at the line contact during radial motion of the shoe plate 18.

Figure 11:
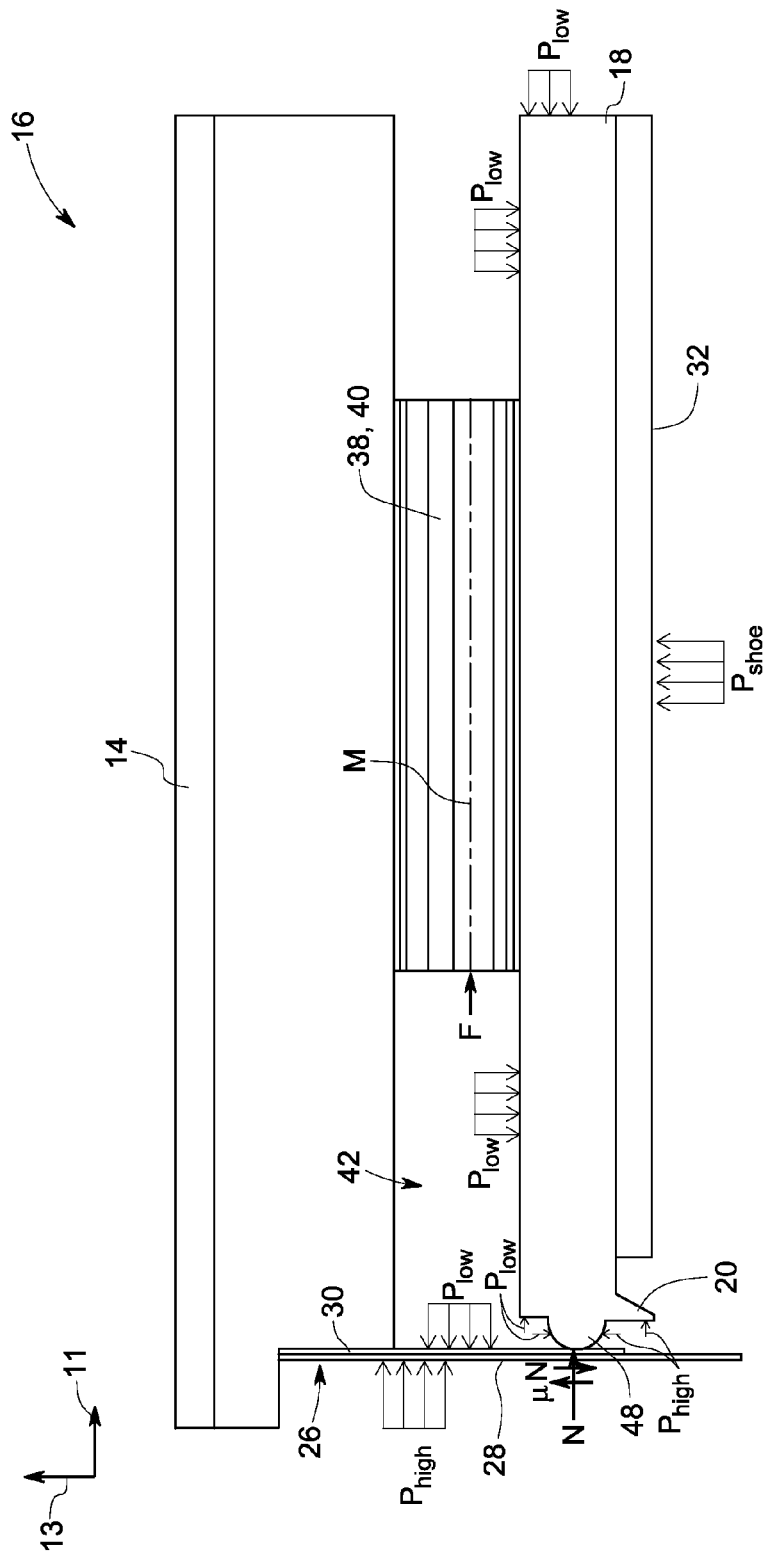
FIG. 11 is a side view of the sealing device segment showing various pressure forces acting on the shoe plate and the secondary seal in accordance with an embodiment of the present invention.

FIG. 11 is a side view of the sealing device segment 16 that shows various pressure forces acting on the shoe plate 18 and the secondary seal 26 in accordance with an embodiment of the present invention. In a non-limiting example, the shoe plate 18 may ride on a fluid film in an aerostatic mode of operation, where the fluid film thickness may range from about 3/1000 inches to 5/1000 inches depending on an initial seal assembly clearance with the rotor. In the aerostatic mode of operation, the forces acting on the shoe plate 18 are an axial force N due to contact force from secondary seal 26, wherein the secondary seal 26 is subjected to pressure force $P_{high}$ on forward side and pressure force $P_{low}$ on aft side during pressurization, a friction force μN due to contact force from the secondary seal 26, a small radial opening force on the shoe plate 18 due to unequal pressures force $P_{low}$, $P_{high}$, respectively above and below the elevated nose 48, and an axial force caused by the unequal pressures on the radially vertical faces of the shoe plate 18. It is to be noted that the load-bearing surface region 32 is subjected to a pressure force $P_{shoe}$ and the shoe face on the inner cavity side is subjected to the pressure force $P_{low}$. Upon pressurization and in the absence of rotation, since majority of the axial pressure drop occurs across the labyrinth tooth 20, the pressure $P_{shoe}$ is almost equal to $P_{low}$. In this aerostatic sense, the shoe plate 18 is inherently pressure balanced in radial direction for most of the shoe length leaving only a very small opening force caused by the unbalanced radial force across the elevated nose 48. Such a pressure-balanced seal is advantageous for both low and high-pressure applications, where the pressurization will not cause the seal to open and leak excessively. It is to be noted that the sealing device segment 17 as shown in FIG. 7 may include similar pressure forces acting on the shoe plate 18 and the secondary seal 26 as discussed with respect to the sealing device segment 16. However, it is to be further noted that for the embodiment shown in FIG. 8, the above discussion for sealing device segment 21 is equally valid except that the pressure force within the front cavity 33 is $P_{high}$ and the pressure force $P_{shoe}$ is almost equal to $P_{high}$. Furthermore, in these various embodiments as shown in FIG. 2, FIG. 3, FIG. 7 and FIG. 8, the moment-balance is addressed with the zero-tilt design explained below and the effects of rotor speed are addressed in the aerodynamic mode of operation.

In this embodiment as shown in FIG. 11, the position of the contact between the secondary seal 26 and the stator interface element 14 at the radially outer end, the position of the contact between the inner layer section 30 of the secondary seal 26 with the shoe plate 18 at the radially inner end (i.e. the location of the elevated nose); and the attachment location of the plurality of bellow springs 38, 40 or flexures to the shoe plate 18 and to the stator interface element 14 at predetermined positions are based on a relative position of a line of action of an effective axial force F, acting on the plurality of bellow springs or flexures for attaining a zero or small front-aft tilt of the shoe plate. The position of line of action of effective axial force F acting on the plurality of bellow springs or flexures is defined as the sum of moments caused due to all the applied forces on the shoe (moments calculated about the point located at the axial midspan of the bellow springs 38, 40 or flexures where the bellow springs 38, 40 or flexures connect with the shoe plate 18) divided by the total axial force acting on the shoe plate 18. It is to be noted that a zero-tilt causes the shoe plate to remain parallel to the rotor before, after and during pressurization of the rotary machine. This zero-tilt of the shoe plate 18 is achieved when the line of action of the effective axial force F acts on a midpoint (radial direction) of the bellow springs 38, 40 or flexures. As shown in this embodiment, the relative position of the effective axial force F is the midpoint M, wherein M is half of a length measured radially from the attachment of the plurality of bellow springs 38, 40 or flexures with the shoe plate 18 to attachment of the plurality of bellow springs 38, 40 or flexures with the stator interface element 14. During manufacturing, the line of action of the effective axial force F is ensured to pass through the midpoint M by adjusting one or more of the dimensions of the shoe plate 18 (thickness or location of elevated nose 48 or radius of elevated nose 48), dimensions and material properties of the secondary seal 26 (length, thickness, tilt angle/profile), dimensions and material of the plurality of bellows springs or flexures (radial height, thickness), friction properties of the secondary seal 26 and the shoe plate 18. It is to be noted that the shoe plate 18 may ride on a fluid film in an aerodynamic mode of operation, where the fluid film thickness may range from about 0.3/1000 inches to 3/1000 inches depending on an initial seal assembly clearance with the rotor. The discussion above for force balance and zero-tilt aerostatic mode is equally valid for aerodynamic mode except that the pressures $P_{shoe}$ are different (higher) in the case of aerodynamic mode compared to the aerostatic mode due to the shoe design features described later. The additional pressure $P_{shoe}$ is balanced by a radial spring force caused due to the compression of the bellow springs or flexures.

Figure 12:
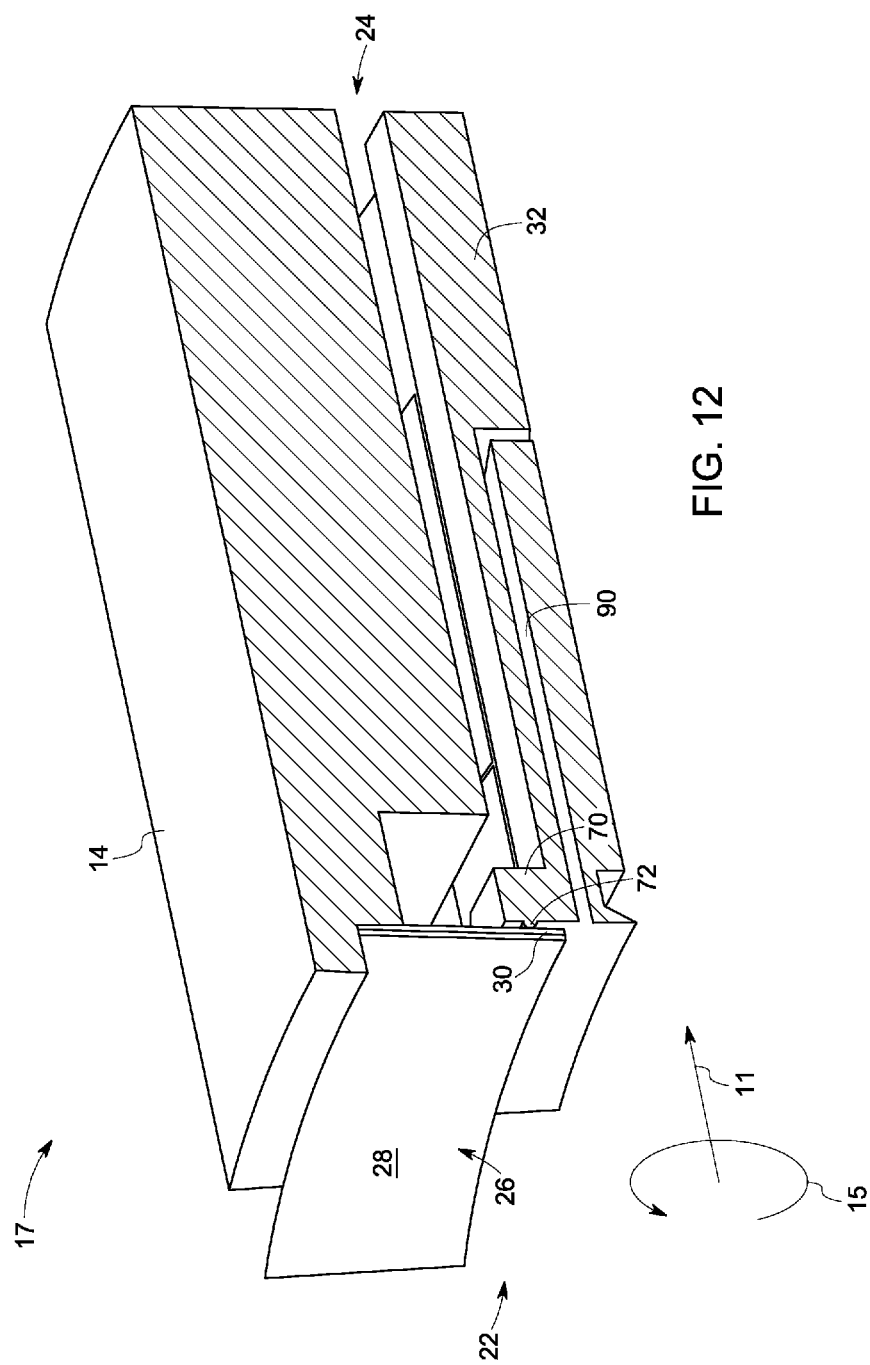
FIG. 12 is a cross-section view at center of the sealing device segment 17 in accordance with an embodiment of the present invention.

FIG. 12 is a cross-section view at center of the sealing device segment 17 in accordance with an embodiment of the present invention. As shown, the shoe plate 18 includes one or more pressurization ports 90 located axially for allowing flow of the high pressure fluid to a rotor-shoe gap. This high pressure fluid causes a small opening force that moves the shoe plate 18 radially outwards by about 1/1000 inch to 2/1000 inch. This initial lift or opening is important for sealing device segments that are assembled line-on-line with the rotor or assembled with an interference with the rotor. The one or more pressurization ports 90 provide the advantage for assembling the sealing device segments 17 closer to the rotor. The one or more pressurization ports 90 help avoid start-up rubs by providing an aerostatic pressure distribution between the rotor and the shoe plate, thereby lifting the shoe plate 18 away from the rotor during the initial rotation start-up phase when the aerodynamic force is not large enough to avoid shoe plate-rotor contact. The axial location of the port 90 is suitably chosen such that the aerostatic pressure distribution causes a uniform shoe plate lift-off without any front-aft tilting of the shoe. In another embodiment, a flexible tube (not shown in FIG. 12) is routed suitably to carry high pressure fluid to the load-bearing surface. The flexibility of the tube is designed to allow for radial motion of the shoe plate 18 without any additional radial stiffness caused by the tube connection.

Figure 13:
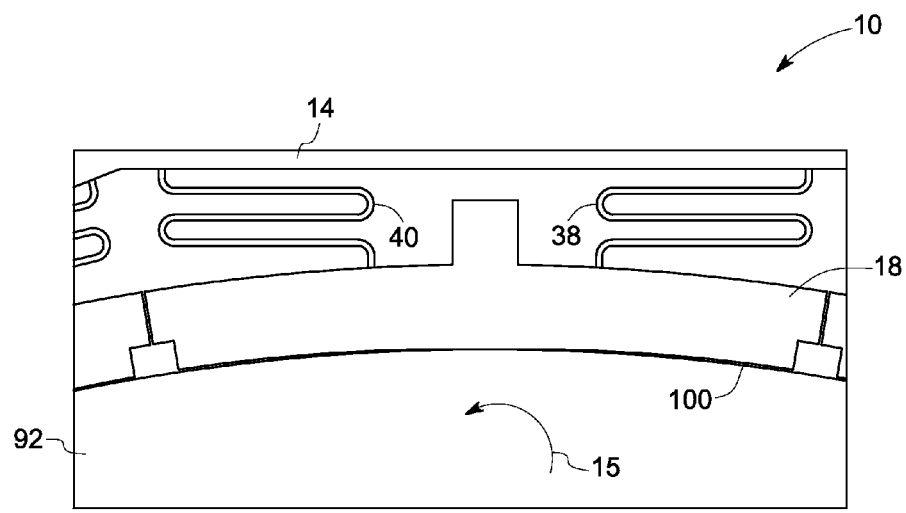
FIG. 13 shows a shoe-rotor curvature in the seal assembly in accordance with an embodiment of the present invention.

FIG. 13 shows a shoe-rotor curvature in the seal assembly 10 in accordance with an embodiment of the present invention. The seal assembly 10 also operates in an aerodynamic mode of operation. When the rotor-shoe plate gap starts reducing (e.g. during a thermal transient event causing clearance change), a thin fluid film 100 starts building additional pressure. In this embodiment, the radius of curvature of the shoe plate 18 is intentionally machined to be larger than the rotor radius. As a consequence, when the rotor-shoe plate gap becomes small (typically less than 1/1000 inch), the fluid film 100 is either monotonically converging or converging-diverging in the direction of rotation. This fluid film in a form of fluid wedge causes additional pressure to build-up. The physics of thin film is well understood from hydrodynamic journal bearings or foil bearings, and can be modeled using appropriate fluid flow models. The basic principle is that any negative gradient in the fluid film thickness in the direction of rotation will increase the pressure in the fluid film above its boundary pressure. The additional pressure caused by the thin fluid film squeezes the bellow springs 38, 40 thereby, moving the shoe plate 18 radially outwards and keeping the rotor 92 from contacting the shoe plate 18. In this sense, any outward excursion of the rotor 92 is tracked by the shoe plate 18 on every sealing device segment 16, 17, 23, 25.

Figure 14:
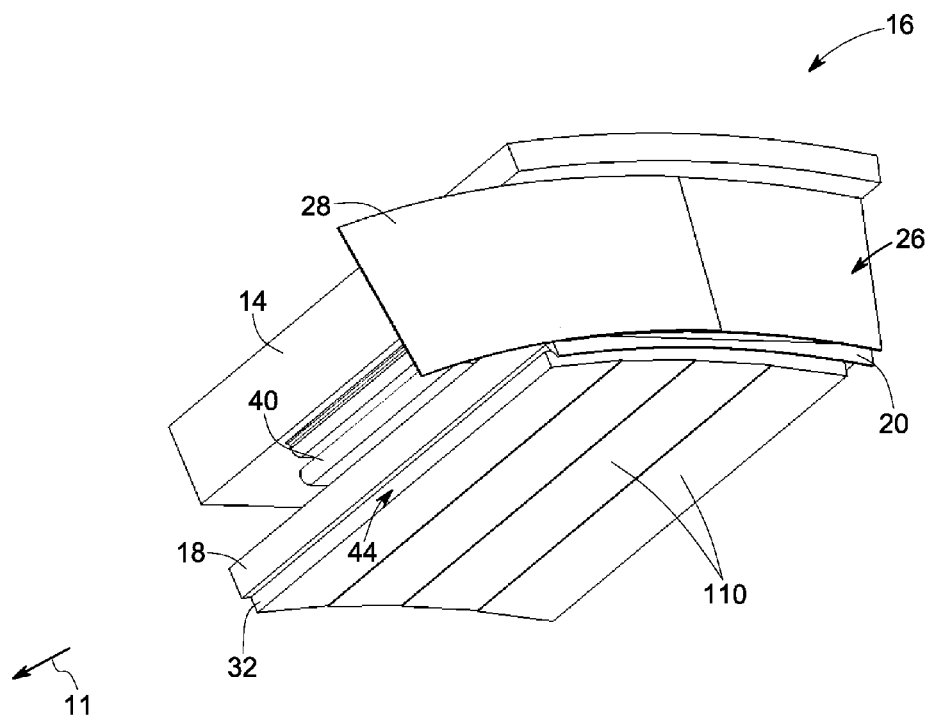
FIG. 14 shows grooves on a load-bearing surface in a sealing device segment in accordance with an embodiment of the present invention.

In another embodiment as shown in FIG. 14, the thin fluid film generates additional aerodynamic force due to the presence of grooves 110 or pockets (not shown in FIG. 14) on the load-bearing surface region 32 facing the rotor. The grooves 110 or pockets are in the form of a series of wedges that causes formation of a convergent fluid film in the direction of rotation. The grooves 110 or pockets can be aligned at an angle relative to the axial direction. In yet another embodiment, the load-bearing surface region 32 includes one or more Rayleigh steps facing the rotor for generating the aerodynamic force.

Figure 15:
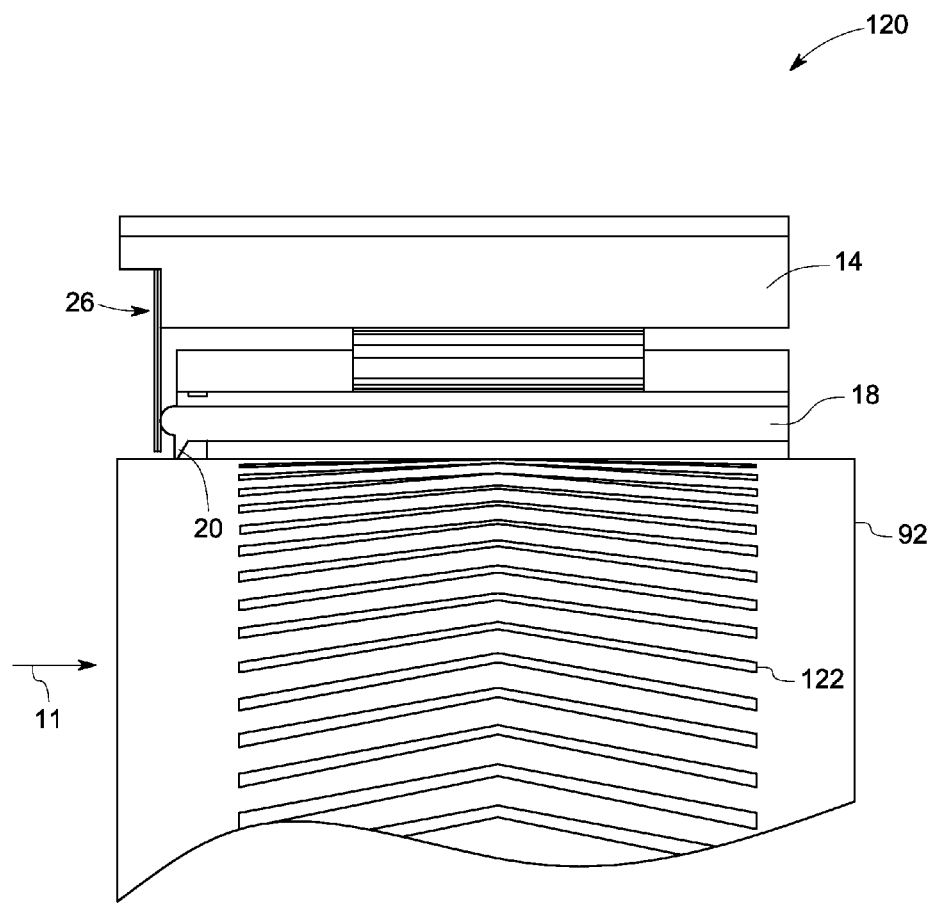
FIG. 15 shows a rotor-stator seal assembly in accordance with an embodiment of the present invention.

FIG. 15 shows a rotor-stator seal assembly 120 in accordance with an embodiment of the present invention. In one embodiment, the rotor-stator seal assembly 120 includes slots 122 in a herringbone pattern on the rotor 92 for generating aerodynamic forces during operation of the turbo-machinery. The herringbone pattern on the rotor 92 could be in the direction of rotation or opposite to the direction of rotation. In another embodiment, the rotor 92 includes grooves or pockets or slots that are in either axial or angled in a combined axial-tangential direction (these angles slots grooves or pockets are not shown in FIG. 15). Further, the slots or grooves or pockets on the rotor 92 are aligned in the direction of rotation or opposite to the direction of rotation.

Figure 16:
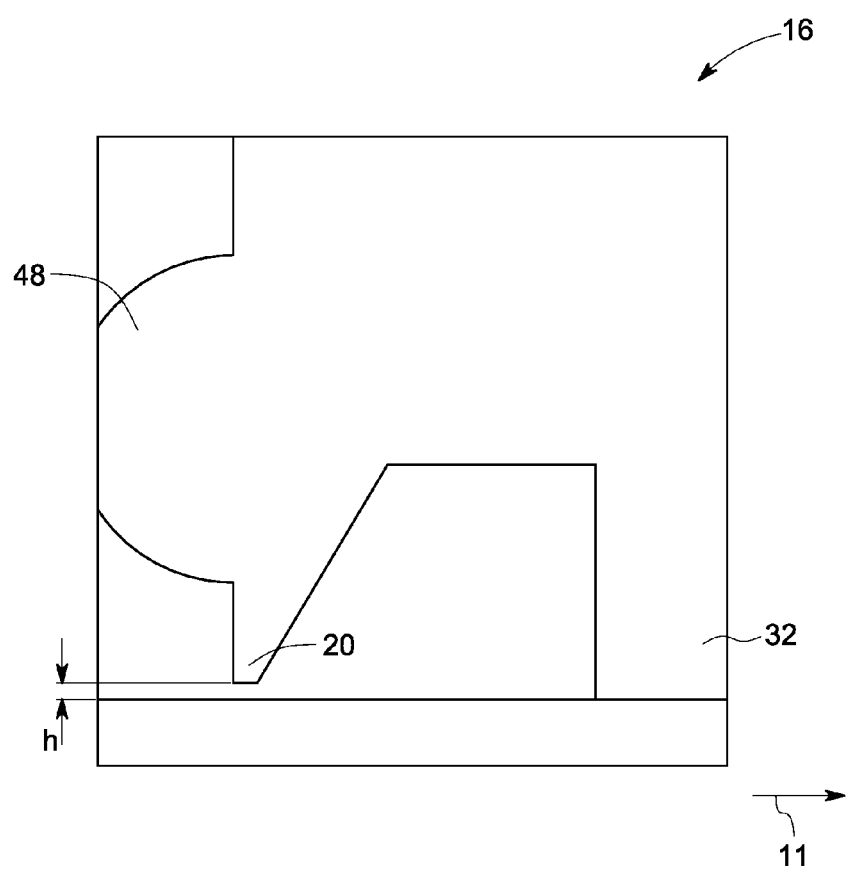
FIG. 16 shows a portion of the sealing device segment in accordance with an embodiment of the present invention.

FIG. 16 shows a cross-section view for a portion of the sealing device segment 16 where the labyrinth teeth 20 are located at a radial height 'h' away from the load-bearing surface 32. These results in the labyrinth tooth 20 running at a larger clearance from the rotor than the clearance between the load-bearing portion and the rotor. This difference in radial clearance allows for accommodation of a bi-directional tilt correction. During operation of the rotary machine, the load-bearing surface region 32 is intended to ride almost parallel to the rotor along the axial direction. However due to assembly mismatch or unexpected thermal or pressure loading, the load-bearing surface region 32 tilts so that either the forward or the aft edge of the load-bearing surface region 32 is closer to the rotor. If the aft edge is closer to the rotor, riding gap between the aft edge and the rotor is smaller than the riding gap between the forward edge and the rotor. This leads to larger aerodynamic force generation on the shoe plate 18 near the aft edge, causing a correcting aerodynamic moment on the shoe plate. This aerodynamic moment prevents the shoe plate from rubbing against the rotor on the aft edge. On the other hand, if the load-bearing surface region 32 is tilted such that the forward edge is closer to the rotor and if the dimension 'h' (as described above) is zero, then the labyrinth teeth 20 might rub into the rotor because of the insufficient area available to generate aerodynamic moment needed for correcting the shoe plate tilt. However, a non-zero clearance 'h' causes the forward edge of the load-bearing surface region 32 to interface with the rotor before the labyrinth teeth 20 rubs against the rotor, thereby allowing the load-bearing portion to generate the needed correcting aerodynamic moment.

In a non-limiting example, both the bellows springs 38, 40 and the secondary seal 26 (as shown in FIG. 2) are formed from high temperature metal alloy shims like Inconel X750 or Rene41. In one embodiment, both ends of the bellow springs 38, 40 are brazed to the stator interface element 14 and the shoe plate 18, which are machined or cast. In another embodiment, the bellow springs or flexures are machined using an EDM procedure, which allows machining of the stator interface, the bellows or flexures and the shoe from a single block of metal. In a non-limiting example, the load bearing portion 32 of the shoe plate 18 may be coated with lubricating and/or wear-resistant coating, which comprises of chromium or nickel or molybdenum as the base along with hard phases and solid lubricants. In another non-limiting example, the coating on the load-bearing surface 32 of the shoe plate 18 comprises of cobalt-based alloys. Such coatings can handle unintentional rubs between the shoe plate 18 and the rotor. In another embodiment, the rotor surface interfacing with the shoe plate 18 may be coated with Chromium carbide or Tungsten Carbide or similar coatings to improve the rotor's hardness, corrosion resistance and the ability to maintain a good surface finish.

Figure 17:
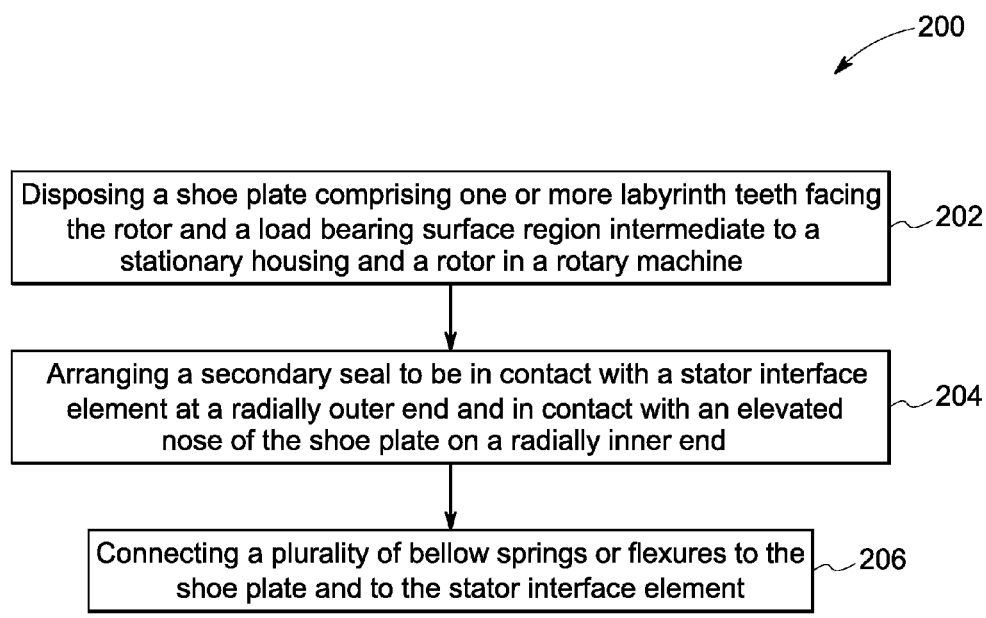
FIG. 17 is flow chart illustrating steps involved in method of manufacturing a sealing device segment in accordance with an embodiment of the present invention.

FIG. 17 is flow chart 200 illustrating steps involved in method of manufacturing a sealing device segment. At step 202, the method includes disposing a shoe plate comprising one or more labyrinth teeth facing the rotor and a load-bearing surface region intermediate to a stationary housing and a rotor in a rotary machine. The shoe plate is configured to allow a high pressure fluid to an upstream portion of the forwardmost labyrinth tooth and a low pressure fluid to a downstream portion of the aftmost labyrinth tooth and further configured to generate an aerodynamic force between the shoe plate and the rotor. At step 204, the method also includes arranging a secondary seal to be in contact with a stator interface element at a radially outer end and in contact with an elevated nose of the shoe plate on a radially inner end. Further, at method 206, the method includes connecting a plurality of bellow springs or flexures to the shoe plate and to the stator interface element. This method includes contacting the secondary seal with the stator interface element at the radially outer end and the elevated nose of the shoe plate at the radially inner end at predetermined positions based on a relative position of a line of action of an effective axial force on the plurality of bellow springs or flexures for attaining a zero or small front-aft tilt of the shoe plate.

Further the method also includes connecting an inner layer section of the secondary seal to the stator interface element and contacting the inner layer section with an elevated nose of the shoe plate. The method also includes overlapping the segment gaps between the inner layer sections of neighboring sealing device segments with an overhanging portion an outer layer section of the secondary seal.

In another embodiment, the method also includes coating on the load-bearing surface region of the shoe plate with a lubricating coating and/or a wear resistant coating. In a non-limiting example, the wear-resistant and lubricating coating on the load-bearing surface 32 of the shoe 18 comprises of chromium or nickel or molybdenum as the base along with hard phases and solid lubricants. In another non-limiting example, the coating on the load-bearing surface 32 of the shoe plate 18 comprises of cobalt-based alloys. Such coatings can handle unintentional rubs between the shoe plate 18 and the rotor. Furthermore, in another embodiment, the method includes coating a rotor surface interfacing the shoe plate with a wear-resistant coating material. In a non-limiting example, the wear-resistant coating material is chosen from a group of chromium carbide or tungsten carbide and the like.

Figure 18:
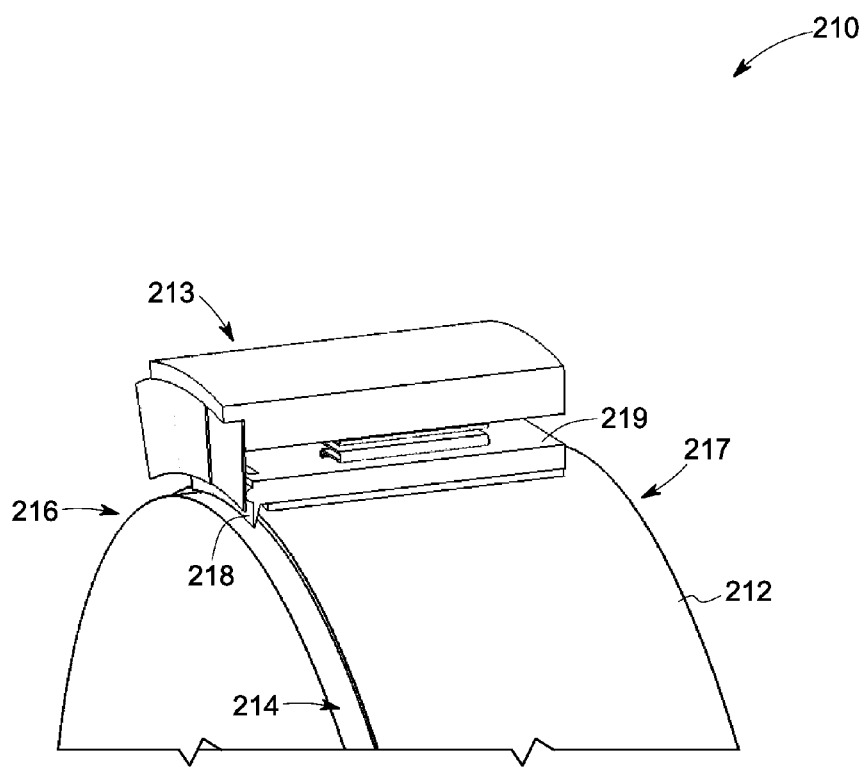
FIG. 18 shows a perspective view of a rotor-stator seal assembly in accordance with an embodiment of the present invention.

FIG. 18 shows a perspective view of a rotor-stator seal assembly 210 having multiple sealing device segments 213 (only one sealing device segments is shown) arranged around a rotor 212 for reducing leakage in accordance with an embodiment of the present invention. In this embodiment, the rotor-stator seal assembly 210 includes the rotor 212 having a stepped section 214 towards a high pressure side 216 of the rotary machine for reducing an axial momentum of flow of fluid across one or more labyrinth teeth 218 of the shoe plate 219. In this embodiment, the stepped section 214 includes a rotor portion with locally decreased radius with a first optimal length of the one or more labyrinth teeth 218 facing the rotor portion with locally decreased radius for reducing an axial momentum of flow of fluid from the high pressure side 216 to a low pressure side 217.

Figure 19:
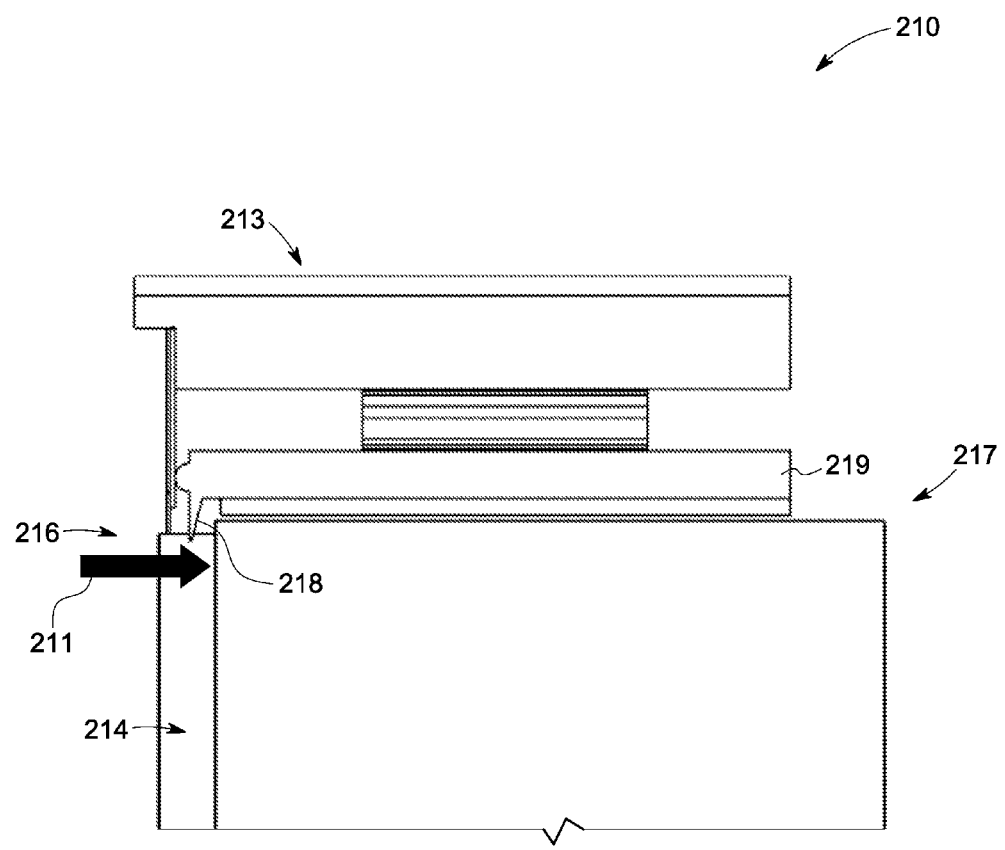
FIG. 19 is a side view of a rotor-stator seal assembly as shown in FIG. 17 in accordance with another embodiment of the present invention.

FIG. 19 a side view of the rotor-stator seal assembly 210 as shown in FIG. 18 in accordance with an embodiment of the present invention. As illustrated, the stepped section 214 towards the high pressure side 216 of the rotary machine reduces the axial momentum of a flow of fluid 211 across one or more labyrinth teeth 218 of the shoe plate 219.

Figure 20:
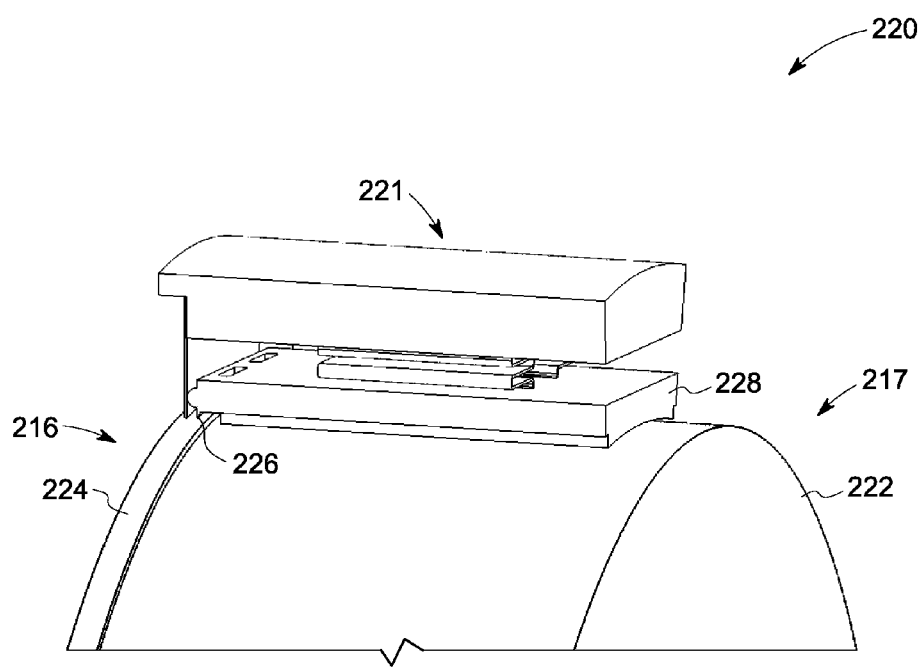
FIG. 20 shows a perspective view of a rotor-stator seal assembly in accordance with an embodiment of the present invention.

In another embodiment, FIG. 20 shows a perspective view of a rotor-stator seal assembly 220 having multiple sealing device segments 221 (only one sealing device segments is shown) arranged around a rotor 222 for reducing leakage in accordance with another embodiment of the present invention. In this embodiment, the rotor-stator seal assembly 220 includes a rotor 222 having a stepped section 224 towards a high pressure side 216 of the rotary machine for reducing an axial momentum of flow of fluid across one or more labyrinth teeth 226 of the shoe plate 228. In this embodiment, the stepped section 224 includes a rotor portion with locally increased radius with a second optimal length of the one or more labyrinth teeth 226 facing the rotor portion with locally increased radius for reducing an axial momentum of flow of fluid from the high pressure side 216 to the low pressure side 217.

Figure 21:
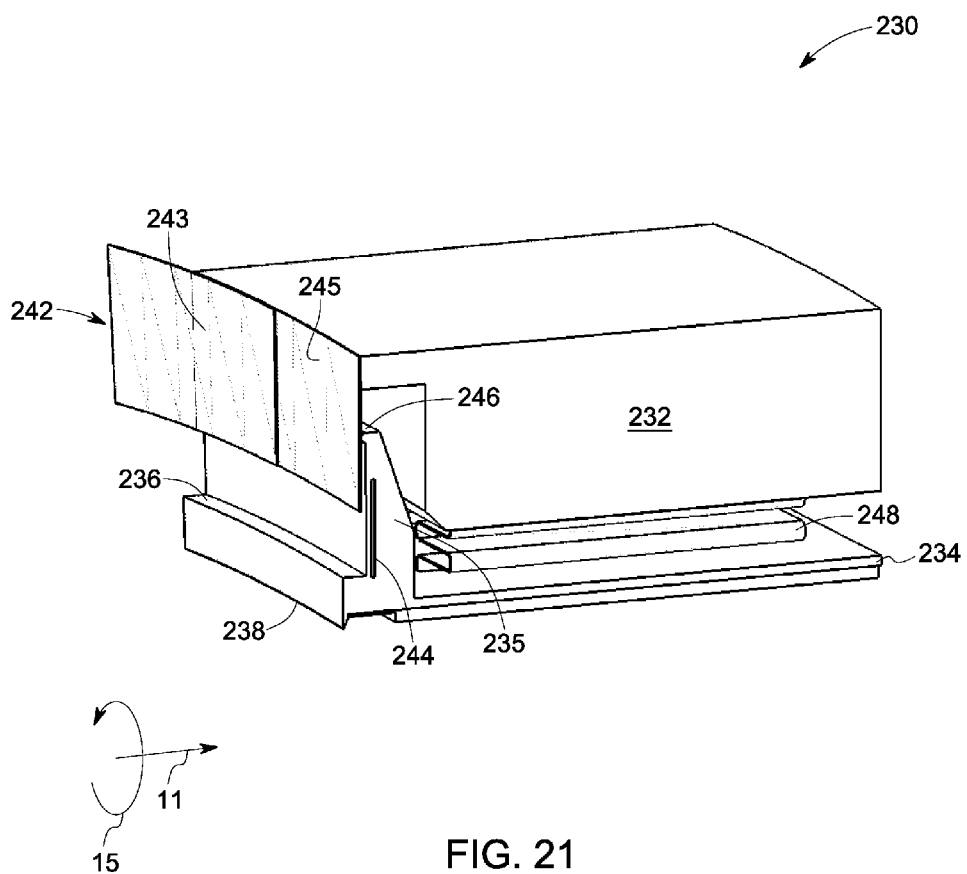
FIG. 21 is a perspective view of a sealing device segment in accordance with yet another embodiment of the present invention.

FIG. 21 is a perspective view of a sealing device segment 230 in accordance with an embodiment of the present invention. The sealing device segment 230 is shown to have an orientation in axial and circumferential direction as given by 11, and 15 respectively. The seal assembly includes multiple sealing device segments 230 disposed circumferentially intermediate to a stationary housing and a rotor (not shown). Each of the sealing device segments 230 includes a stator interface element 232. The sealing device segment 230 also includes a shoe plate 234 with an extended portion 236 having one or more labyrinth teeth 238 facing the rotor and a load bearing portion 240. The shoe plate 234 is configured to allow a high pressure fluid to an upstream portion of forwardmost labyrinth tooth 238 and a low pressure fluid to a downstream portion of the aft most labyrinth tooth 238 and further configured to generate an aerodynamic force between the shoe plate 234 and the rotor. Further, the extended portion 236 towards a front end of the shoe plate 234 has one or more labyrinth teeth 238. The extended portion 236 also includes a radial wall 235 which further includes one or more grooves or slots 244 at sides for allowing disposal of spline seal shims for reducing leakage between neighboring sealing device segments 230. The sealing device segment 230 further includes a secondary seal 242 configured to be in contact with the stator interface element 232 at a radially outer end and configured to be in contact with an elevated nose section 246 of the radial wall 235 of the shoe plate 234 on a radially inner end. The sealing device segment 230 also includes multiple flexible elements 248 attached to the shoe plate 234 and to the stator interface element 232.

Non-limiting examples of the flexible elements 248 may include bellow springs, flexures or other spring-like elements including flexible beams, leaf springs or coil springs. It is to be noted that in FIG. 21, the flexible element 248 is shown as bellow springs but such depiction should not be restrictive to the invention in this application. The purpose of the flexible element 248 is to support the shoe plate 234 with radial, tangential and axial stiffness properties and guide the motion of the shoe plate 234 relative to the stator interface element 232.

Further, the secondary seal 242 includes a secondary seal outer layer section 243 and a secondary seal inner layer section 245 such that each of the outer layer sections 243 of the secondary seal 242 overlaps the sealing device segment gaps formed between inner layer sections 245 of adjacent secondary seal device segments 230.

Figure 22:
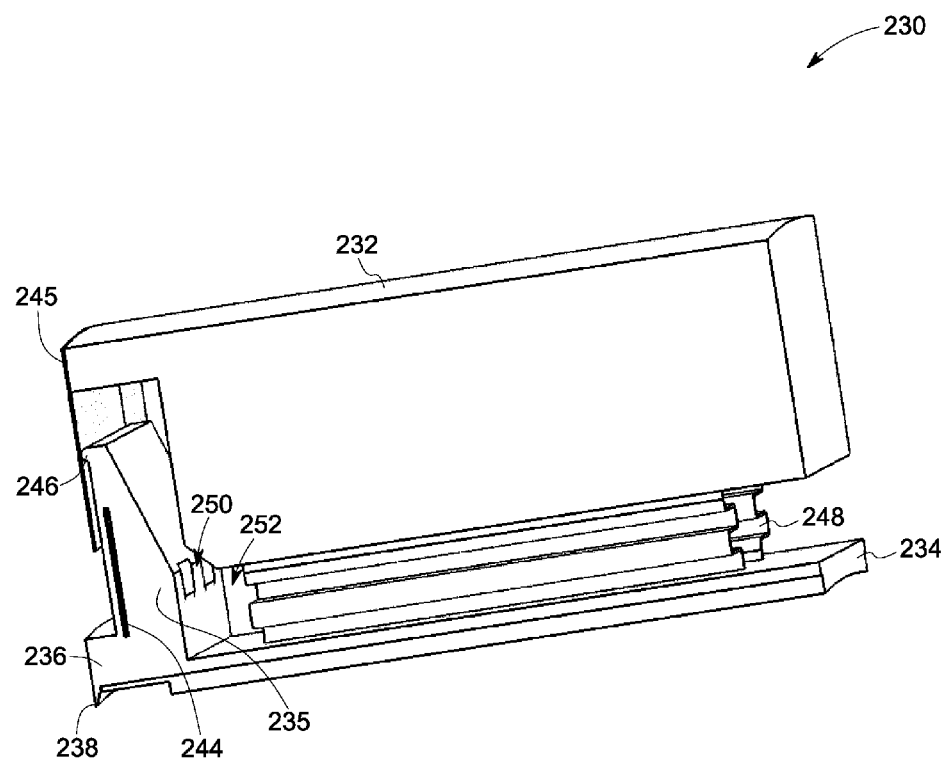
FIG. 22 is another view of the sealing device segment as shown in FIG. 21.

FIG. 22 is another view of the sealing device segment 230 as shown in FIG. 21. As shown, the radial wall 235 of the shoe plate 234 includes one or more ports 250 downstream of the labyrinth teeth for allowing flow of low pressure fluid to the downstream portion of aftmost labyrinth tooth 238 from a rear cavity 252 formed by the plurality of flexible elements 248, the stator interface element 232 and the shoe plate 234.

Figure 23:
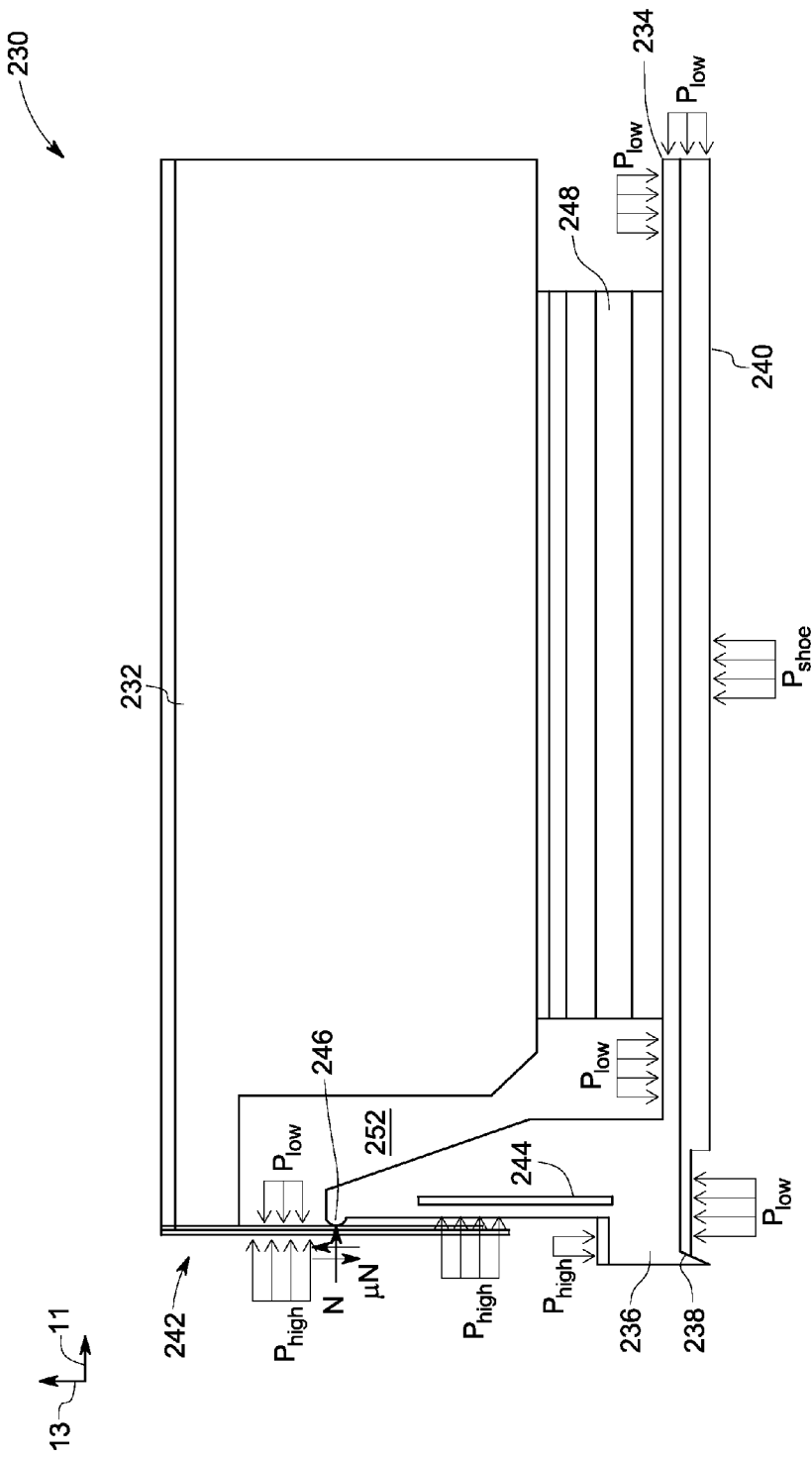
FIG. 23 is a side view of the sealing device segment as shown in FIG. 21 and FIG. 22 illustrating various pressure forces acting on the shoe plate and the secondary seal in accordance with an embodiment of the present invention.

FIG. 23 is a side view of the sealing device segment 230 as shown in FIG. 21 and FIG. 22 illustrating various pressure forces acting on the shoe plate 234 and the secondary seal 242 in accordance with an embodiment of the present invention. In the aerostatic mode of operation, the forces acting on the shoe plate 234 are an axial force N due to contact force from secondary seal 242, wherein the secondary seal 242 is subjected to pressure force $P_{high}$ on forward side and pressure force $P_{low}$ on aft side during pressurization, a friction force $\mu N$ due to contact force from the secondary seal 242, a small radial opening force on the shoe plate 234 due to unequal pressure force $P_{low}$, $P_{high}$, respectively above and below the elevated nose section 246, unequal pressure force $P_{high}$, $P_{low}$, respectively above and below the extended portion 236, and an axial force caused by the unequal pressures on the radially vertical faces of the shoe plate 234. It is to be noted that the load-bearing surface region 240 is subjected to a pressure force $P_{shoe}$ and the shoe face on the inner cavity side is subjected to the pressure force $P_{low}$. Upon pressurization and in the absence of rotation, since majority of the axial pressure drop occurs across the labyrinth tooth 238, the pressure $P_{shoe}$ is almost equal to $P_{low}$. In this aerostatic sense, the shoe plate 234 will upon pressurization experience a closing force in radial direction caused by the resultant unbalanced radial force across the elevated nose section 246 and the extended portion 236. Such a sealing device segment 230 with pressure-actuated closing is advantageous for sealing locations where the sealing device segments needs to be assembled with large clearances and the sealing device segments needs to be actuated radially inwards towards the spinning rotor to work in the thin film aerodynamic mode of operation.

It is to be noted that the seal assemblies with multiple sealing device segments as described in FIG. 21 and FIG. 22 includes rotor that may or may not include a stepped section towards a high pressure side of the rotary machine for reducing an axial momentum of flow of fluid across the one or more labyrinth teeth of the shoe plate. In one embodiment, the stepped section includes a rotor portion with locally increased radius with a first optimal length of the one or more labyrinth teeth facing the rotor portion with locally increased radius for reducing an axial momentum of flow of fluid from a high pressure side to a low pressure side. In another embodiment, the stepped section includes a rotor portion with locally decreased radius with a second optimal length of the one or more labyrinth teeth facing the rotor portion with locally decreased radius for reducing an axial momentum of flow of fluid from a high pressure side to a low pressure side. In yet another embodiment, the rotor does not have a stepped section towards the high pressure side.

Figure 24:
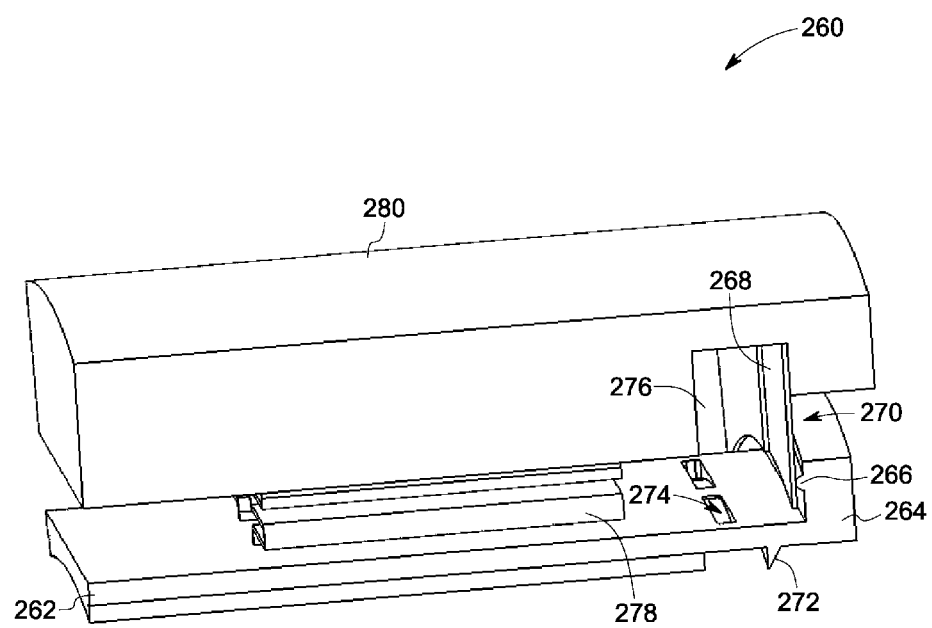
FIG. 24 is a perspective view of a sealing device segment in accordance with yet another embodiment of the present invention.

FIG. 24 is a perspective view of a sealing device segment 260 in accordance with yet another embodiment of the present invention. In this embodiment, the shoe plate 262 includes an L-shaped structure 264 with an elevated nose section 266 for contact with an inner layer section 268 of a secondary seal 270. The L-shaped structure 264 includes one or more labyrinth teeth 272 located towards a backward end of the shoe plate 262 for separating a high pressure side from a low pressure side. The L-shaped structure also includes one or more ports 274 for allowing flow of high pressure fluid from a front cavity 276 formed by the plurality of bellow springs or flexures 278, a stator interface element 280 and the shoe plate 262 to an upstream portion of front most labyrinth tooth 272. In one embodiment, the one or more ports 274 are angled for allowing flow of the high pressure fluid in a radial direction from the front cavity 276 to the upstream portion of the forwardmost labyrinth tooth 272. In another embodiment, the one or more ports 274 are angled for allowing flow of the high pressure fluid in a circumferential direction causing the fluid to swirl as the fluid transfers from the front cavity 276 to the upstream portion of the forwardmost labyrinth tooth 272.

Figure 25:
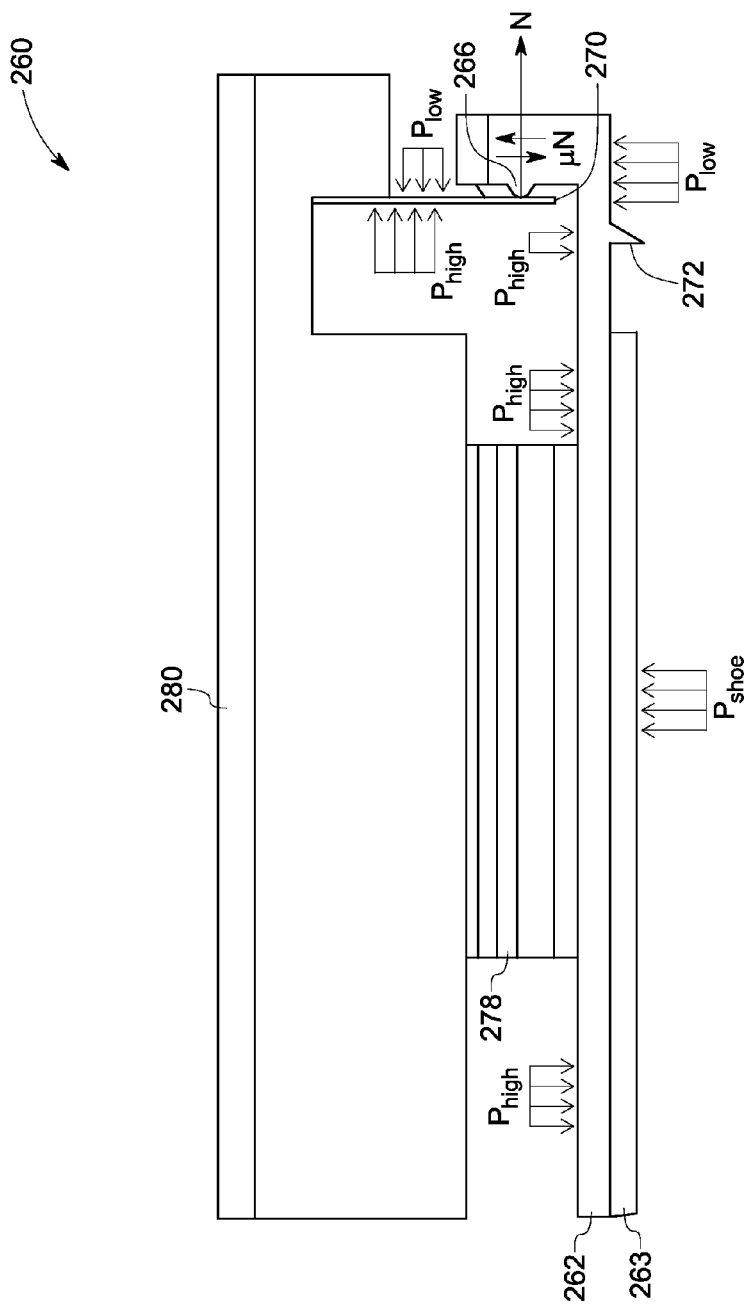
FIG. 25 is a side view of the sealing device segment as shown in FIG. 24 illustrating various pressure forces acting on the shoe plate and the secondary seal in accordance with an embodiment of the present invention.

FIG. 25 is a side view of the sealing device segment 260 that shows various pressure forces acting on the shoe plate 262 and the secondary seal 270 in accordance with an embodiment of the present invention. The forces acting on the shoe plate 262 are an axial force N due to contact force from the secondary seal 270, wherein the secondary seal 270 is subjected to pressure force $P_{high}$ on forward side and pressure force $P_{low}$ on aft side during pressurization, a friction force μN due to contact force from the secondary seal 270, a radial closing force on the shoe plate 262 due to unequal pressure force $P_{low}$, $P_{high}$, respectively below and above the shoe plate 262 towards the downstream side of the one or more labyrinth teeth 272, and an axial force caused by the unequal pressures on the radially vertical faces of the shoe plate 262. It is to be noted that a load-bearing surface region 263 is subjected to a pressure force $P_{shoe}$ and the shoe face on the inner cavity side is subjected to the pressure force $P_{high}$. Upon pressurization and in the absence of rotation, since majority of the axial pressure drop occurs across the labyrinth tooth 272, the pressure $P_{shoe}$ is almost equal to $P_{high}$. In this aerostatic sense, the shoe plate 262 is not pressure balanced in the radial direction and has a closing force caused by the unbalanced radial force downstream of the one or more labyrinth teeth 272. This closing force causes the stretching of the bellow springs or the flexures 278 and the sealing device segment 260 moves towards the spinning rotor. Such a sealing device segment 260 with pressure-actuated closing is advantageous for sealing locations where the sealing device segments needs to be assembled with large clearances and the sealing device segments needs to be actuated radially inwards towards the spinning rotor to work in the thin film aerodynamic mode of operation. It is to be noted that the moment-balance is addressed with the zero-tilt design explained below and the effects of rotor speed are addressed in the aerodynamic mode of operation.

It is to be noted that a zero-tilt causes the shoe plate 262 to remain parallel to the rotor before, after and during pressurization of the rotary machine. This zero-tilt of the shoe plate 262 is achieved when the line of action of the effective axial force F acts on a midpoint (radial direction) of the bellow springs or flexures 278. The relative position of the effective axial force F is the midpoint M, wherein M is half of a length measured radially from the attachment of the plurality of bellow springs or flexures 278 with the shoe plate 262 to attachment of the plurality of bellow springs or flexures 278 with the stator interface element 280. During manufacturing, the line of action of the effective axial force F is ensured to pass through the midpoint M by adjusting one or more of the dimensions of the shoe plate 262 (thickness or location of elevated nose 266 or radius of elevated nose 266), dimensions and material properties of the secondary seal 270 (length, thickness, tilt angle/profile), dimensions and material of the plurality of bellows springs or flexures (radial height, thickness), friction properties of the secondary seal 270 and the shoe plate 262. It is to be noted that the shoe plate 262 may ride on a fluid film in an aerodynamic mode of operation, where the fluid film thickness may range from about 0.3/1000 inches to 3/1000 inches depending on an initial seal assembly clearance with the rotor. The discussion above for force balance and zero-tilt aerostatic mode is equally valid for aerodynamic mode except that the pressures $P_{shoe}$ are different (higher) in the case of aerodynamic mode compared to the aerostatic mode due to the shoe design features described later. The closing force described earlier in aerostatic mode of operation causes the stretching of the bellow springs or the flexures 278 and the sealing device segment 260 moves towards the spinning rotor. However, as soon as the clearance between the load-bearing surface region 263 of the shoe plate 262 and the spinning rotor becomes small (typically smaller than 1/1000 inch), the shoe plate 262 experiences a radially outwards film force caused by the thin film between the load-bearing surface region 263 of the shoe plate 262 and the spinning rotor. The presence of features on the shoe plate 262 (like curvature mismatch or Rayleigh steps as described earlier in FIG. 13 and FIG. 14) cause generation of an aerodynamic force that resists the pressure-actuated closing force. This in the aerodynamic regime, the radially inwards closing force is balanced by a combination of the spring stretching and the radially outwards aerodynamic film force. This dynamic equilibrium allows us to operate the sealing device segment 260 with small radial clearances on the rotor, which is particularly advantageous for leakage performance of the seal assembly. Such a sealing device segment 260 with pressure-actuated closing is advantageous for sealing locations where the sealing device segments needs to be assembled with large clearances and the sealing device segments needs to be actuated radially inwards towards the spinning rotor to work in the thin film aerodynamic mode of operation.

It is to be noted that the seal assemblies with multiple sealing device segments as described in FIG. 23 and FIG. 24 may or may not include a rotor that includes a stepped section towards the low pressure side of the rotary machine for reducing an axial momentum of flow of fluid across the one or more labyrinth teeth of the shoe plate. In one embodiment, the stepped section includes a rotor portion with locally increased radius with a first optimal length of the one or more labyrinth teeth facing the rotor portion with locally increased radius for reducing an axial momentum of flow of fluid from a high pressure side to a low pressure side. In another embodiment, the stepped section includes a rotor portion with locally decreased radius with a second optimal length of the one or more labyrinth teeth facing the rotor portion with locally decreased radius for reducing an axial momentum of flow of fluid from a high pressure side to a low pressure side. In yet another embodiment, the rotor does not have a stepped section towards the high pressure side.

Figure 26:
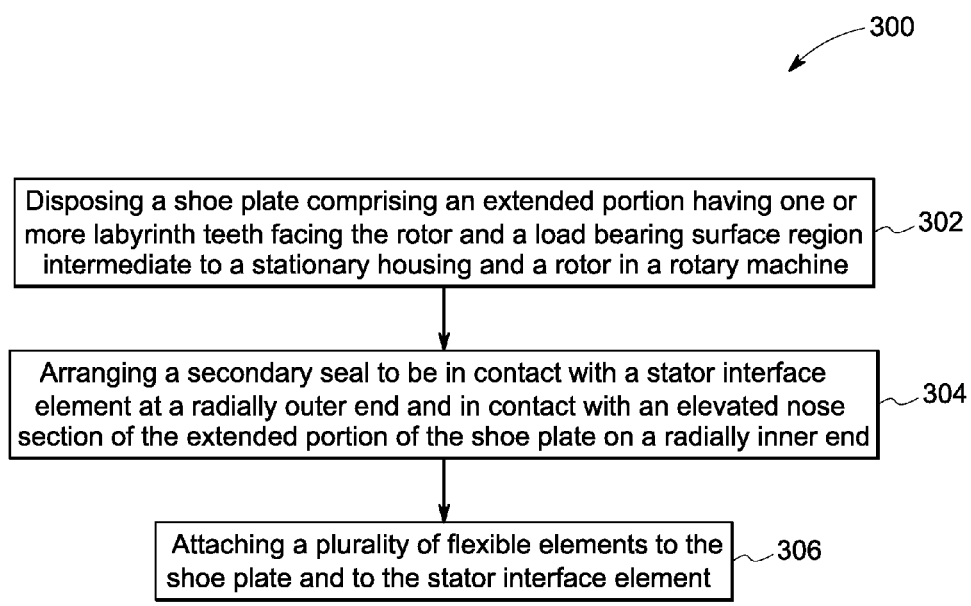
FIG. 26 is flow chart illustrating steps involved in method of manufacturing a sealing device segment as shown in FIG. 24 and FIG. 25.

FIG. 26 is a flow chart 300 illustrating steps involved in method of manufacturing a sealing device segment. At step 302, the method includes disposing a shoe plate comprising an extended portion having one or more labyrinth teeth facing the rotor and a load bearing surface region intermediate to a stationary housing and a rotor in a rotary machine, wherein the shoe plate is configured to allow a high pressure fluid to an upstream portion of the forwardmost labyrinth tooth and a low pressure fluid to a downstream portion of the aftmost labyrinth tooth and further configured to generate an aerodynamic force between the shoe plate and the rotor. At step 304, the method includes arranging a secondary seal to be in contact with a stator interface element at a radially outer end and in contact with an elevated nose section of the extended portion of the shoe plate on a radially inner end. Further at step 304, the method includes attaching a plurality of flexible elements to the shoe plate and to the stator interface element.

Furthermore, the method includes connecting an inner layer section of the secondary seal to the stator interface element and contacting the inner layer section with an elevated nose of the shoe plate and further overlapping the segment gaps between the inner layer sections of neighboring sealing device segments with an overhanging portion an outer layer section of the secondary seal. The method also includes providing the rotor with a stepped section towards a high pressure side of the rotary machine for reducing an axial momentum of flow of fluid across the one or more labyrinth teeth of the shoe plate, wherein the stepped section includes a rotor portion with locally increased or decreased radius with an optimal length of the one or more labyrinth teeth facing the rotor portion with locally increased or decreased radius for reducing an axial momentum of flow of fluid from a high pressure side to a low pressure side. The method may also include contacting the secondary seal with the stator interface element at the radially outer end and the elevated nose of the shoe plate at the radially inner end at predetermined positions based on ensuring that a line of action of an effective axial force passes through the plurality of flexible elements at about the radial midspan of the plurality of bellow springs or flexures in order to attain a zero or small front-aft tilt of the shoe plate.

Advantageously, the present aerodynamic seal assemblies are reliable, robust seal for several locations in rotating machinery with large pressure drops and large transients. These seals can also be used in locations where the seal starts with a large assembly clearance and later moves radially inwards towards the rotor upon pressurization. The seal assemblies are also economical to fabricate. The non-contact operation of the seals makes them especially attractive for the large rotor transient locations. Further, the present invention allows independent controlling of the spring stiffness and the pressure resisting capability, thereby allowing the design of compliant seals that can withstand large differential pressures. Furthermore, the present invention allows for a shoe plate to remain almost parallel to the rotor along the axial direction in aerostatic operation and translate almost parallel to the rotor along the axial direction during the aerodynamic mode. The present invention also includes improved predictability for the radial motion (increased predictability for leakage performance and robustness).

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A seal assembly for a rotary machine, the seal assembly comprising:
   a plurality of sealing, device segments disposed circumferentially intermediate to a stationary housing and a rotor, wherein each of the plurality of sealing device segments comprises:
   a stator interface element;
   a shoe plate comprising an extended portion having one or more labyrinth teeth facing the rotor and a load bearing portion, wherein the shoe plate is configured to allow a high pressure fluid to an upstream portion of forwardmost labyrinth tooth and a low pressure fluid to a downstream portion of the aftmost labyrinth tooth and further configured to generate an aerodynamic force by varying film thickness in a tangential direction based on at least one of a curvature mismatch between the shoe plate and the rotor, steps on the shoe and grooves on the rotor,
   a secondary seal configured to be in contact with the stator interface element at a radially outer end and configured to be in contact with an elevated nose section of the extended portion of the shoe plate on a radially inner end, wherein the secondary seal comprises an outer layer section and an inner layer section such that each of the outer layer section of the secondary seal having an overhanging portion overlaps a sealing device segment gap formed between inner layer section of adjacent secondary seal segments; and
   a plurality of flexible elements attached to the shoe plate and to the stator interface element.

2. The seal assembly of claim 1, wherein the extended portion of the shoe plate comprises the one or more labyrinth teeth located on a protuded portion towards a front end of the shoe plate for separating, a high pressure side from a low pressure side.

3. The seal assembly of claim 1, wherein the rotor comprises a stepped section towards a high pressure side of the rotary machine for reducing an axial momentum of flow of fluid across the one or more labyrinth teeth of the shoe plate, wherein the stepped section comprises a rotor portion with a locally increased radius with a first length of the one or more labyrinth teeth facing the rotor portion with the locally increased radius for reducing an axial momentum of flow of fluid from a high pressure side to a low pressure side, and a locally decreased radius with a second length of the one or more labyrinth teeth facing the rotor portion with the locally decreased radius for reducing an axial momentum of flow of fluid from a high pressure side to a low pressure side.

4. The seal assembly of claim 1, wherein the extended portion of the shoe plate comprises one or more grooves or slots for allowing disposal of one or more spline seal shims for reducing leakage between neighboring sealing device segments.

5. The seal assembly of claim 1, wherein the shoe plate comprises the one or more labyrinth teeth located towards a backward end of the shoe plate for separating a high pressure side from a low pressure side.

6. The seal assembly of claim 5, wherein the rotor comprises a stepped section towards the low pressure side of the rotary machine for reducing, an axial momentum of flow of fluid across the one or more labyrinth teeth of the shoe plate.

7. The seal assembly of claim 5, wherein the shoe plate comprises one or more ports upstream of the labyrinth teeth for allowing flow of high pressure fluid to an upstream portion of frontmost labyrinth tooth from a front cavity formed by the plurality of flexible elements, the stator interface element and the shoe plate, thereby causing pressurization on the shoe plate to achieve an aerostatic force balance rendering the shoe plate towards the rotor during operation of the rotary machine.

8. A seal assembly for a rotary machine, the seal assembly comprising:
a plurality of sealing device segments disposed circumferentially intermediate to a stationary housing and a rotor, wherein each of the plurality of sealing device segments comprises:
a stator interface element;
a shoe plate comprising one or more labyrinth teeth facing the rotor and a load bearing surface region, wherein the shoe plate is configured to allow a high pressure fluid to an upstream portion of forwardmost labyrinth tooth and a low pressure fluid to a downstream portion of the aftmost labyrinth tooth and further configured to generate an aerodynamic force by varying film thickness in a tangential direction based on at least one of a curvature mismatch between the shoe plate and the rotor, steps on the shoe and grooves on the rotor,
a secondary seal configured to be in contact with the stator interface element at a radially outer end and configured to be in contact with an elevated nose of the shoe plate on a radially inner end, wherein the secondary seal comprises an outer layer section and an inner layer section such that each of the outer layer section of the secondary seal having an overhanging portion overlaps a sealing device segment gap formed between inner layer section of adjacent secondary seal segments; and
a plurality of flexible elements attached to the shoe plate and to the stator interface element; and
the rotor comprising a stepped section towards a high pressure side of the rotary machine for reducing an axial momentum of flow of fluid across the one or more labyrinth teeth of the shoe plate.

9. The seal assembly of claim 8, wherein the stepped section comprises a rotor portion with locally decreased radius with a first length of the one or more labyrinth teeth facing the rotor portion with locally decreased radius for reducing an axial momentum of flow of fluid from a high pressure side to a low pressure side.

10. The seal assembly of claim 8, wherein the stepped section comprises a rotor portion with locally increased radius with a second length of the one or more labyrinth teeth facing the rotor portion with locally increased radius for reducing an axial momentum of flow of fluid from a high pressure side to a low pressure side.

11. A seal assembly for a rotary machine, the seal assembly comprising:
a plurality of sealing device segments disposed circumferentially intermediate to a stationary housing and a rotor, wherein each of the plurality of sealing device segments comprises:
a stator interface element;
a shoe plate comprising an extended portion having one or more labyrinth teeth facing the rotor and a load bearing portion, wherein the shoe plate is configured to allow a high pressure fluid to an upstream portion of forwardmost labyrinth tooth and a low pressure fluid to a downstream portion of the aftmost labyrinth tooth and further configured to generate an aerodynamic force by varying film thickness in the tangential direction based on a curvature mismatch between the shoe plate and the rotor, and the extended portion of the shoe plate comprises one or more ports downstream of the labyrinth teeth for allowing flow of low pressure fluid to a downstream portion of aftmost labyrinth tooth from a rear cavity formed by the plurality of flexible elements, the stator interface element and the shoe plate, thereby causing pressurization on the shoe plate to achieve a force balance rendering the shoe plate towards the rotor during operation of the rotary machine;
a secondary seal configured to be in contact with the stator interface element at a radially outer end and configured to be in contact with an elevated nose section of the extended portion of the shoe plate on a radially inner end, wherein the secondary seal comprises an outer layer section and an inner layer section such that each of the outer layer section of the secondary seal having an overhanging portion overlaps a sealing device segment gap formed between inner layer section of adjacent secondary seal segments; and
a plurality of flexible elements attached to the shoe plate and to the stator interface element, wherein the plurality of flexible elements comprise one of bellows springs, leaf springs and coil springs, configured to support the shoe plate with radial, tangential and axial stiffness, and guide the motion of the shoe plate relative to the stator interface element.

* * * * *